United States Patent
Adamovsky et al.

(10) Patent No.: US 8,935,107 B1
(45) Date of Patent: Jan. 13, 2015

(54) SHOCK SENSING SYSTEM AND METHOD

(75) Inventors: Grigory Adamovsky, Solon, OH (US); Roger P Tokars, Cleveland, OH (US)

(73) Assignee: The United States of America as Represented by the Adminstrator of National Aeronautics and Space Adminstration, Washington, DC (US)

( * ) Notice: Subject to any disclaimer, the term of this patent is extended or adjusted under 35 U.S.C. 154(b) by 360 days.

(21) Appl. No.: 13/030,342

(22) Filed: Feb. 18, 2011

(51) Int. Cl.
- *G01F 17/00* (2006.01)
- *G01B 11/26* (2006.01)
- *G01F 1/74* (2006.01)

(52) U.S. Cl.
CPC .. *G01F 1/74* (2013.01); *G01B 11/26* (2013.01)
USPC ...................... 702/50; 356/139.07

(58) Field of Classification Search
CPC .......... G01F 1/74; G02B 5/18; G02B 5/1828; G02B 6/29304; G02B 6/29319; G02B 6/29328; G02B 6/29329
USPC ............. 702/50, 49, 56, 138, 150; 73/112.01, 73/147; 359/244; 356/28, 28.5, 128, 129, 356/214, 139.07
See application file for complete search history.

(56) References Cited

U.S. PATENT DOCUMENTS

| | | | |
|---|---|---|---|
| 4,776,696 A * | 10/1988 | Hettrick et al. | ............... 356/328 |
| 5,072,612 A | 12/1991 | Iverson, Jr. et al. | |
| 5,153,655 A | 10/1992 | Suzuki et al. | |
| 5,424,824 A | 6/1995 | Daiber et al. | |
| 5,515,158 A | 5/1996 | Heineck | |
| 5,715,047 A * | 2/1998 | Adamovsky | ................... 356/128 |
| 5,784,154 A | 7/1998 | Pawliszyn | |
| 5,982,478 A | 11/1999 | Ainsworth et al. | |
| 6,476,908 B1 | 11/2002 | Watson | |
| 6,636,632 B2 * | 10/2003 | Okada | ........................... 382/194 |
| 7,239,777 B1 | 7/2007 | Christensen et al. | |
| 7,313,299 B2 | 12/2007 | Christensen et al. | |
| 2003/0235919 A1* | 12/2003 | Chandler | ......................... 436/43 |
| 2004/0119979 A1* | 6/2004 | Duarte et al. | .................. 356/443 |
| 2004/0160606 A1* | 8/2004 | Lakowicz et al. | ............. 356/445 |
| 2010/0013860 A1* | 1/2010 | Mandella et al. | ............. 345/650 |

OTHER PUBLICATIONS

J. Panda, "Partial Spreading of a Laser Beam Into Light Sheet by Shock Waves and its use as a Shock Detection Technique", The University of Toledo, NASA Contractor Report 195329, May 1994.*
F. Peters, "Improving small laser light sheets by means of a diffractive optical element", Experiments in Fluids 35 (2003) 4-7, Jun. 2003.*

(Continued)

*Primary Examiner* — Michael Nghiem
*Assistant Examiner* — Yoshihisa Ishizuka
(74) *Attorney, Agent, or Firm* — Robert H. Earp, III

(57) ABSTRACT

A compact shock sensing system and method that employ a light sheet generator that can be used either as a solo aerodynamic shock detector or in a combination with a scanning mode shock sensor is disclosed. This shock sensing system and method can be used to detect and track unstable and travelling shocks in high speed aerodynamic flows, such as those found in supersonic inlets.

19 Claims, 34 Drawing Sheets

(56) References Cited

OTHER PUBLICATIONS

Santi, P. A., Johnson, S. B., Hillenbrand, M., Grandpre, P. Z., Glass, T. J. and Leger, J. R..; "Thin-sheet Laser Imaging Microscopy for Optical Sectioning of Thick Tissues," BioTechniques 46:287-294 (Apr. 2009).

Thew, L., Prenel, J. P.,and Porcar, R.; "Theoretical and Experimental Intensity Analysis of Laser Light Sheets for Flow Visualization," Elsevier Science B. V., Optics Communications 123 (Feb. 1, 1996) 801-809.

Peters, R., Grabmann, A., Schimmel, H., and Kley, B.; "improving Small Laser Light Sheets by means of a Diffractive Optical Element," Experiments in Fluids 35 (2003) 4-7.

Diemunsch, G., and Prenel, J. P.; "A Compact Light Sheet Generator for Flow Visualizations", Butterworth & Co (Publishers) Ltd, (1987) 0030-3992/87/030141-04.

Clausen, S. and Astrup, P.; "Oblique Laser-sheet Visualization," Applied Optics (Jul. 1, 1995) vol. 34, No. 19.

\* cited by examiner

SHOCK SENSING SYSTEM AND METHOD

BACKGROUND

Variations in the density of a compressible medium (e.g., a gas such as air), known as density inhomogeneities, are important phenomena in aerodynamics. Shocks are one type of density inhomogeneity that can occur when an object moves through the medium faster than the speed at which waves (e.g., sound or pressure waves in air) propagate in the medium. Shocks are regions in the medium characterized by sudden changes in pressure, temperature, and density.

Aerodynamic shocks are usually characterized by parameters such as the shock strength and the shock thickness. The shock strength is conventionally defined as a pressure ratio across the shock or, because it may also be defined as a density ratio, a ratio of refractive indices of the air before and after the shock. The shock thickness is the distance in the direction normal to the shock over which the change in air density occurs. The shock thickness depends upon the mean free path that gas molecules travel before colliding.

Shocks are particularly relevant in the study, design, testing, and performance of vehicles and other objects travelling at supersonic speeds (i.e., having a Mach number between one and five, meaning that the vehicle or object's speed is between one and five times the speed of sound) and hypersonic speeds (i.e., having a Mach number greater than five). In supersonic and hypersonic vehicles, fore-body and engine inlet performance are critical to the overall integrated performance of these vehicles. For instance, scramjet inlets and vehicle fore-bodies are designed for a certain Mach number (shock-on-lip), and their performance deteriorates in other regimes.

Because of the importance of shocks, numerous studies have been performed on shocks and their effects on performance of supersonic vehicles and their components. Various schemes to analyze high speed flows and evaluate performance of aircraft and spacecraft components have been developed. A need for shock position sensors capable of meeting flight qualifying requirements has been recognized and attempts have been made to develop such sensors. Early efforts were concentrated around using pressure taps along the inlet walls. The positions of the shocks were determined by tracking the pressure reading and locating the pressure jump associated with the shock. This basic technique evolved into several wall pressure-based configurations of normal shock position sensing systems. Despite apparent initial success, these wall pressure-based measuring techniques have serious drawbacks. Two important drawbacks are slow response due to pneumatic manifolds used and the effect of the boundary layer on the stability of pressure readings. These issues can seriously restrict applicability of these techniques to normal shock detection and control during supersonic flight.

Moreover, for a commercial aircraft, economic efficiency has to be achieved in order to make supersonic flight economically viable. As a result, an effective control system is required, in addition to avoiding an unstart, to provide the most economical operating regime for the engine (achieved by minimizing the fuel consumption).

Optical flow analyzing methods do not have the same issues of the wall pressure-based measuring techniques and optical flow visualization is widely used in ground-based flow analyzing facilities. Effects of propagation of light through density inhomogeneities have been conventionally detected and visualized by interferometers, Schlieren systems, and shadowgraphs.

Flow visualization techniques such as interferometric, Schlieren, and shadowgraphy typically involve a laser or other source of light and a collimating lens that forms a nearly plane wave. The wave is sent through a transparent section of the test facility normal to the direction of the air flow. After passing through the transparent section of the facility, the plane wave is displayed on a screen or a charge-coupled device (CCD) or diode array. If the air flow is homogeneous and the air density is constant everywhere inside the test section, the display is uniformly illuminated. However, if the flow contains density variations, the illumination of the display is not uniform but rather has dark and bright regions. The contrast of the resultant pattern depends on the strength of the density variations or the density gradient as well as the visualization technique used. Among conventional flow visualization techniques, e.g., interferometry, Schlieren, and shadowgraph, the shadowgraph is often considered one of the most suitable for shock detection. It is because patterns generated by the technique represent the second order derivatives of the density distribution, and the shocks that are being created by very rapid changes in air densities are traditionally observed best by the shadowgraph.

These conventional flow visualization techniques, despite their wide use, have significant drawbacks. First of all, the techniques are based on filling most of the window of the test section and require high power light sources and large optical components. Thus, they cannot be economically or efficiently used in air- or space-borne systems without significant weight and real estate penalties. On the other hand, small and lightweight low power light sources in the conventional configuration do not generate a signal with a sufficient signal-to-noise ratio at the detector to achieve an adequate resolution. Secondly, the fact that the entire test section has to be illuminated masks the second order phenomena associated with the wave propagation through and interaction with inhomogeneities.

As vehicles are developed with speeds increasingly approaching hypersonic regimes, formation of shocks and their interaction gain even more importance and the need to develop in-flight shock sensing and mitigation technology becomes even more acute. However, the space and weight requirements of conventional systems make them untenable for use on such vehicles.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a compact shock sensing system and method that employs a light sheet generator that could be used either as a solo aerodynamic shock detector or in a combination with a scanning mode shock sensor. This shock sensing system and method can be used to detect and track unstable and travelling shocks in supersonic inlets.

In one example embodiment, the innovation comprises a shock detection system. The system can include a direction manipulation element or a diffraction element to generate a sheet of light from a pencil-shaped column of light. Optionally, both can be included such that the direction manipulation element directs the pencil-shaped column of light toward the diffraction element, which diffracts the pencil-shaped column of light into one or more sectors of light. A subset of the sectors can form a sheet of light located in a plane. The system can also include an optical element that directs at least one of the sectors of light into an aerodynamic flow. A photodetector configured to detect a variation in intensity of the at least one sector of light and a processor coupled to the photodetector can additionally be included in the system. The processor can determine at least one of presence or position of a shock by processing data received from the photodetector.

In some aspects, systems and methods are disclosed and claimed herein for generating a substantially plane (sheet-type) optical beam. For example, a scatterer or diffraction element can interact with a small diameter (pencil-shaped) column of light or beam of light to generate the substantially plane-shaped optical beam. This substantially plane-shaped optical beam may be used in combination with techniques disclosed herein to detect and localize shocks.

In some embodiments, both a direction manipulation element and a diffraction element may be used to generate a sheet of light, while in others, either of the direction manipulation element or the diffraction element may be used without the other. The sheets of light can be generated in either temporal or spatial domain. In the temporal domain case the light sheet can be formed by scanning the pencil-shaped column of light through the medium of interest in a time dependent fashion. In some embodiments with light sheets generated in the temporal domain, the scanning can be done by performing either rotational or translational movements of components in the light sheet generator. Other embodiments can have light sheets generated in the temporal domain by a light sheet generator without moving parts, such as by using a tunable laser that emits light with a wavelength that changes in time in a prescribed manner. Light sheets generated in spatial domain are produced instantaneously in time and can have a time invariant light intensity distribution in the plane in which the light sheets reside. In other configurations, the sheets of light can also be generated in both temporal and spatial domains. In one example, a spatially generated light sheet can be combined with a periodic scanning of the medium of interest with a pencil-shaped column of light. Such an embodiment could provide advantages from both light sheet generating approaches. For instance, while the light sheet in spatial domain is used for shock tracking and location purposes, the scanning beam can be used for a more detailed analysis of that located shock. In another embodiment, the entire spatially generated light sheet can be scanned either rotationally or translationally through the medium of interest in a predetermined time-dependent fashion.

In various embodiments, the geometrical shape of the light sensitive area of the photodetector that detects variations in the light intensity can be varied. In one example, the light sensitive area may be selected to match the manner in which the light sheet is generated. In another example, the sensitive part of the photodetector can be a linear CCD or diode array. In other embodiments, the light sensitive area of the photodetector can have a two-dimensional form and be, for instance, in the shape of a square or circle.

In some embodiments, changes in the laser beam profile upon interaction with the shock (e.g., diffraction, etc.) can be analyzed by one or more techniques disclosed herein. A correlation between a shock's location and a beam's diffraction pattern has been found. For example, the width of the diffraction pattern can be maximized when the laser beam is directed at the center of a shock or other inhomogeneity. Based at least upon these results, techniques for sensing the relative position of a shock and the incident laser beam are discussed herein.

In some situations, shocks may appear at an angle relative to the sheet of light generated for detecting their locations. The angles at which the shocks appear can change with the change in the flow conditions. To track both the location and angle of shocks, two or more sheets of light can be sent through the inhomogeneous medium where shocks may be present. Each of the sheets of light can be generated in a separate plane. Those planes can intersect each other forming one or more lines and the intersecting sheets of light can form angles. The lines formed by intersecting planes that carry the sheets of light can pass through the inhomogeneous media of interest. In some configurations, the lines do not pass through the inhomogeneous area with shocks. Also, in some cases the sheets of light can be perpendicular to each other. In other configurations, the sheets of light can be generated in planes that are parallel to each other.

In further embodiments useable either in ground-based testing or in-flight, the shock sensing system can comprise one or more mechanisms to change the diameter of the small diameter pencil-shaped beam in a prescribed manner. In one example, the one or more mechanisms can change the diameter based at least in part on the atmospheric pressure or pressure density of the medium where the shocks occur. These changes can be made based on measurements of the atmospheric pressure or pressure density of the medium obtained by sensors either external to or included in the shock sensing system.

In addition to shock detection, embodiments discussed herein describe systems (and corresponding methods) that can localize a shock. Two example techniques may be employed to establish the location of the shock using diffraction patterns. A Summing Pixel Counting (SPC) technique based on a wide angle diffraction pattern or a Consecutive Pixel Counting (CPC) technique based on a narrow view may be employed. Automated image processing techniques may be employed alone or in conjunction with other techniques for quantifying the location of the shock in an efficient manner are related. In examples, the shock sensing systems and methods discussed herein may be used in supersonic and hypersonic wind tunnels or in-flight to detect aerodynamic shocks. Also, systems and methods related herein may be used to identify such shock properties as thickness, strength and location of the shock in the direction transverse to the flow. Moreover, because of a small weight and size of components involved, the systems of the innovation may effectively and efficiently be used in air- or space-borne applications.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1A:
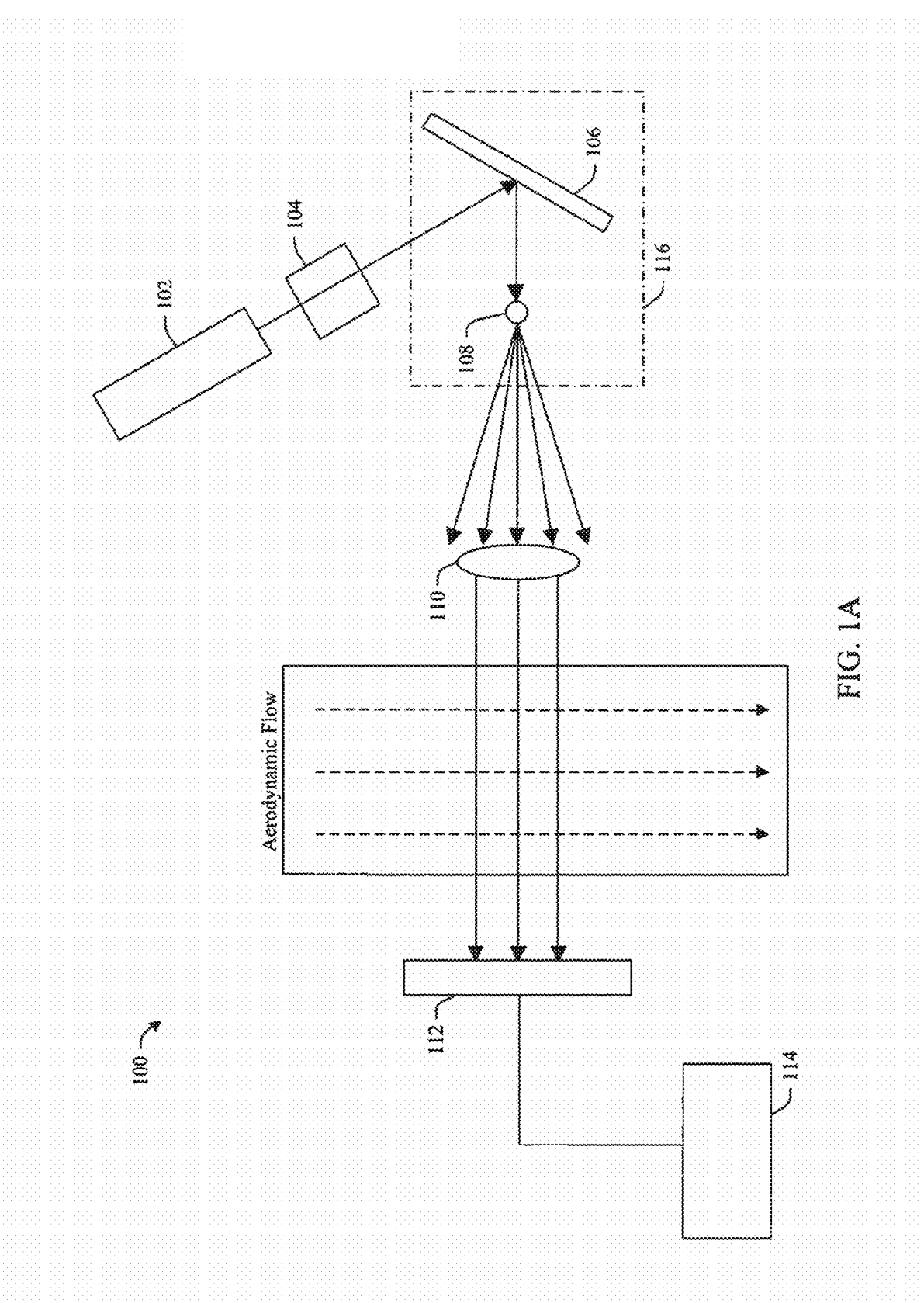
FIG. 1A illustrates an example system that enables easy and reliable shock detection and localization in high speed inlets of aerospace vehicles in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In one example, the innovation includes systems (and corresponding methods) for detecting and localizing shocks in aerodynamic flow, e.g., a high speed inlet of an aerospace vehicle. Optical techniques described further herein can be used to generate one or more substantially planar light sources. In operation, the light can be measured after passing through at least a portion of the inlet. Based on analytical techniques described further herein, the measured light can be analyzed to detect the presence or absence of a shock. Additional analytical techniques described in greater detail later may be used to localize the shock. These optical and analytical techniques are based in part on theoretical analysis and experimental results described herein. A person of ordinary skill in the art would understand, however, that although specific results are discussed herein, these are intended to serve only as examples and not to limit the scope of the innovation.

Turning to FIG. 1A, in one embodiment, the innovation includes an example shock detection system. One potential application of such a system (and corresponding method) is to enable easy and reliable shock detection and localization in high speed inlets of aerospace vehicles, for example, as a control system used to maintain desired flight conditions. System 100 can comprise a light source 102 that emits-light. As appropriate, a beam alignment element 104 (e.g., a laser beam collimator, etc.) can also be included to form the light emitted from the light source into a small diameter pencil-shaped column of light (e.g., a narrow Gaussian beam of light). Additionally, the system can include a direction-manipulation element 106 (e.g., a mirror, diffraction grating, optical fiber, etc.) to direct the pencil-shaped column of light toward a scatterer or diffraction element 108.

Diffraction element 108 can be any element (e.g., one or more wires or slits, etc.) capable of diffracting (or scattering) the pencil-shaped column of light in one or more sectors of light, wherein each of the sector(s) can form a sheet of light located in a plane, and the thickness of the resultant sheet of light can be the same as the original diameter of the pencil-shaped column of light. As non-limiting examples, diffraction element 108 could be a single wire or fiber or two or more wires or fibers. The wires or fibers can be in one plane and at any mutual angle. Alternatively, the two or more wires or fibers can be skew to one another, and may be approximately co-planar or not. Additionally, although wires or fibers are discussed herein, single or multiple slits could alternatively be used to generate one or more sheets of light. At least a portion of the light from diffraction element 108 can be directed to an optical element 110 that can direct at least one of the sectors of light into an aerodynamic flow (e.g., in an inlet, wind tunnel, etc.) in a collimated or otherwise prescribed manner. As an illustrative example, a lens could be used as optical element 110 and arranged such that diffracting element 108 is in the focal plane of the lens in order to collimate the sector(s) of light. The system can also include a photodetector 112 capable of detecting variations in light intensity within the sectors. Variations in intensity can be caused by the presence of inhomogeneities (e.g., aerodynamic shocks). A processor 114 can be coupled to photodetector 112 and process data received from photodetector 112. By processing the data (e.g., by utilizing signal processing apparatuses and algorithms), the processor can determine the presence, position, or other characteristics of an inhomogeniety such as a shock. By way of example, processor 114 can employ one or both of the consecutive pixel counting (CPC) and summing pixel counting (SPC) techniques discussed herein.

As explained herein, either direction manipulation element 106 or diffraction element 108 can be used separately or in combination with each other to generate a sheet of light. In some embodiments, system 100 can include one or both of direction manipulation element 106 or diffraction element 108. Thus, both direction manipulation element 106 and diffraction element 108 can be considered as optional elements of a light sheet generator 116. In various embodiments, light sheet generator 116 comprises one or both of direction manipulation element 106 or diffraction element 108. Depending on the configuration of system 100 and selection of light sheet generator 116, a sheet of light can be generated in a temporal domain, a spatial domain, or both.

Some of the possible additional embodiments involve alterations or modifications of the system described in connection with FIG. 1A. For example, the diffraction pattern may be varied by selection of diffraction element 108. Diffraction element 108 could be selected among opaque or transparent wires or optical fibers, or wires or optical fibers with variable transparency (e.g., semi-transparent optical fibers); opaque and semitransparent half screens; sides of cylindrical opaque and semi-transparent surfaces and other surfaces of rotation; or stand alone structures like wires, slits, half-screens, or other opaque or semi-opaque interfaces as well as imbedded structures like holographically generated gratings and other structures that involve variations in the material properties to produce diffraction effects. Diffraction element 108 can be stationary or can be moved in a translational or rotational manner, either in conjunction with one or more other elements of the system, or separately. Additionally, because the classical diffraction patterns can have "lobes" with bright and dark intensity zones with their locations depending on the number and geometry of diffracting wire(s), the diameter and position of the wire(s) can be selected such that the resulting diffracted and collimated light sheet covers the entire area of interest in the inlet without producing dark zones.

Additionally, although depicted as a mirror in FIG. 1A, direction manipulation element 106 may be any element capable of directing light toward diffraction element 108, such as a mirror, prism, diffraction grating, optical fiber, etc. Also, diffraction element 108 may be permanently attached to direction manipulation element 106.

In some embodiments, aspects of system 100 may be combined with features of a scanning beam system described herein to generate a sheet of light with a location dependent spectrum using a small diameter beam ("pencil beam") and diffraction element 108. The embodiments described herein may be coupled with a pencil-shaped column of light with a time dependent intensity distribution including pulsing in any prescribed manner. For example, the pencil-shaped column of light can interact with direction manipulation element 106 in a time-dependent manner as described herein (e.g., by using a rotating or translating mirror, tunable light source and diffraction grating, etc.), such that the pencil-shaped column of light scans through at least a portion of the aerodynamic flow. In an embodiment in accordance with this example, one embodiment comprises a combination of a scanning pencil beam and a light sheet generating apparatus in which diffracting element 108 in the form of a wire or fiber is positioned within the range of the scanning pencil beam allowing for the light sheet to be produced either after or during each scan of the pencil beam.

Figure 1B:
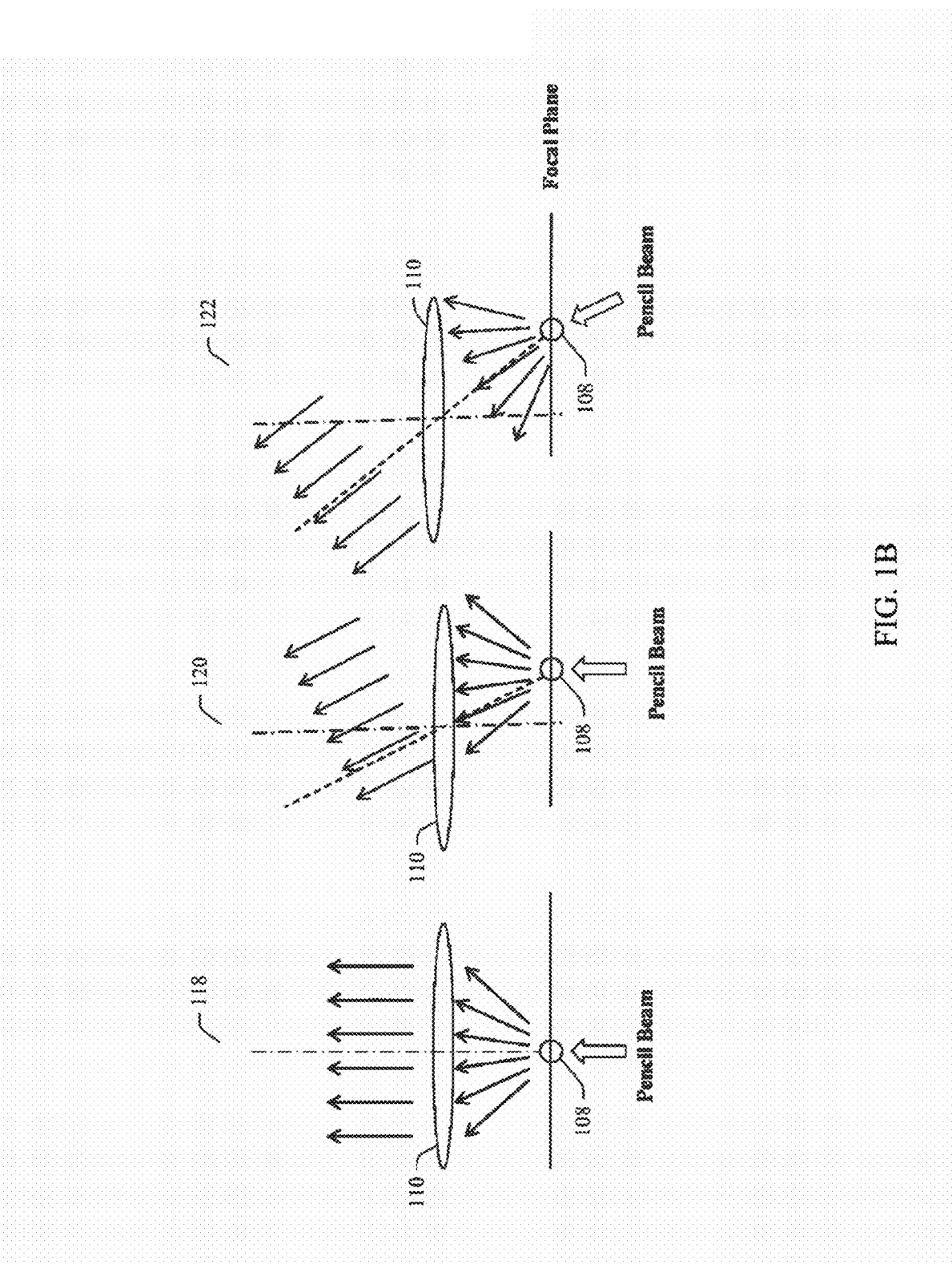
FIG. 1B illustrates off-axis embodiments of a light sheet generator that can be used in connection with a shock sensing system.

FIG. 1B illustrates off-axis embodiments of a light sheet generator that can be used in connection with shock sensing system 100. Configuration 118 represents a case of an on-axis configuration of the light sheet generator with pencil beam being normal to the direction of the aerodynamic flow, such as that depicted in FIG. 1A. Configurations 120 and 122 show examples of embodiments with off-axis configurations of the light sheet generator. As demonstrated in configuration 120, the pencil beam and diffraction element 108 can be positioned off the optical axis of optical element 110 and substantially normal to the direction of the aerodynamic flow. Configuration 122 demonstrates an embodiment wherein the pencil beam and diffraction element 108 can be positioned off of the optical axis of optical element 110 but at an angle other than normal to the direction of the aerodynamic flow.

Positioning of the diffraction element 108 off the central focal point can serve several purposes. First, placing the diffraction element 108 away from the central part of the apparatus could allow the central part to be used simultaneously by another flow visualization technique, such as Schlieren, shadowgraphy, or others, including alternate embodiments of the shock sensing system described herein. In addition, directing the initial pencil beam away from the central part of the apparatus could be used to minimize effects of projecting the image of the diffracting element itself, for instance a fiber or wire, into the field of view of photodetector 112.

Further embodiments can include the selection for diffraction element 108 of two or more coplanar wires. The common plane defined by the coplanar wires can be normal to the direction of the laser beam so as to generate laser sheets in two or more planes. The generation of multiple laser sheets can permit detection of both the position of a shock and its angle, or determination of the two-dimensional position of a shock. Additionally, in other aspects, multiple laser sheets can be used to detect more than one shock.

Figure 1C:
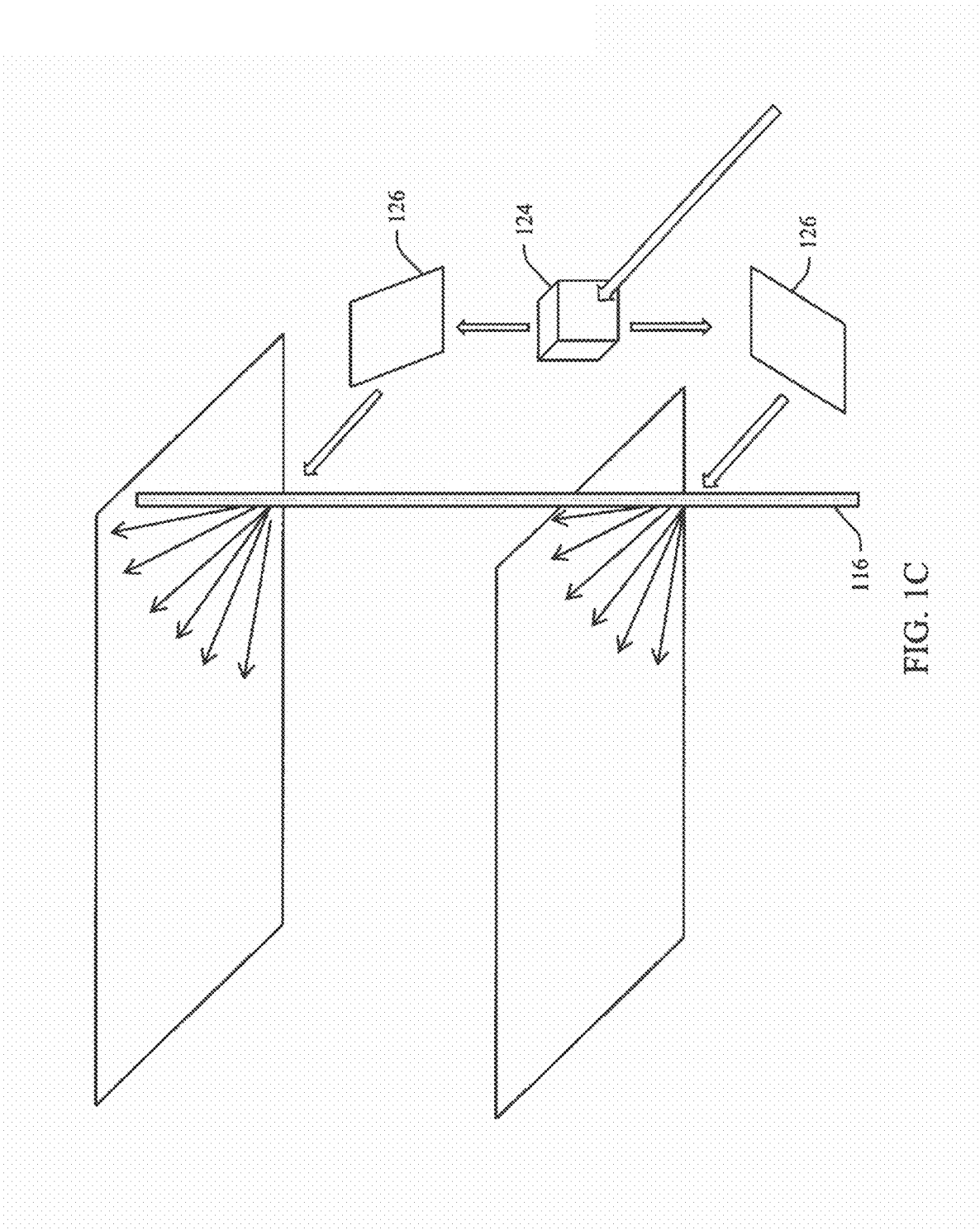
FIG. 1C illustrates an alternate embodiment wherein two sheets of light can be generated by a diffraction element.

FIG. 1C illustrates an alternate embodiment wherein multiple sheets of light can be generated by a light sheet generator 116 such as diffraction element 108. As depicted in FIG. 1C, two light sheets can be formed in two planes parallel to the direction of the flow. In some embodiments, the planes can be parallel to each other. A single incident pencil beam can be split into multiple pencil beams by a beam splitter element 124. Additional direction manipulation elements 126 can be used to direct the multiple pencil beams toward a light sheet generator 116 such as diffraction element 108. Multiple pencil beams can be generated in other manners as well, such as by means of multiple light sources. Although FIG. 1C depicts two parallel sheets of light, more than two sheets of light may be generated, and, depending on selection of elements in system 100, the generated sheets need not be parallel.

Figure 1D:
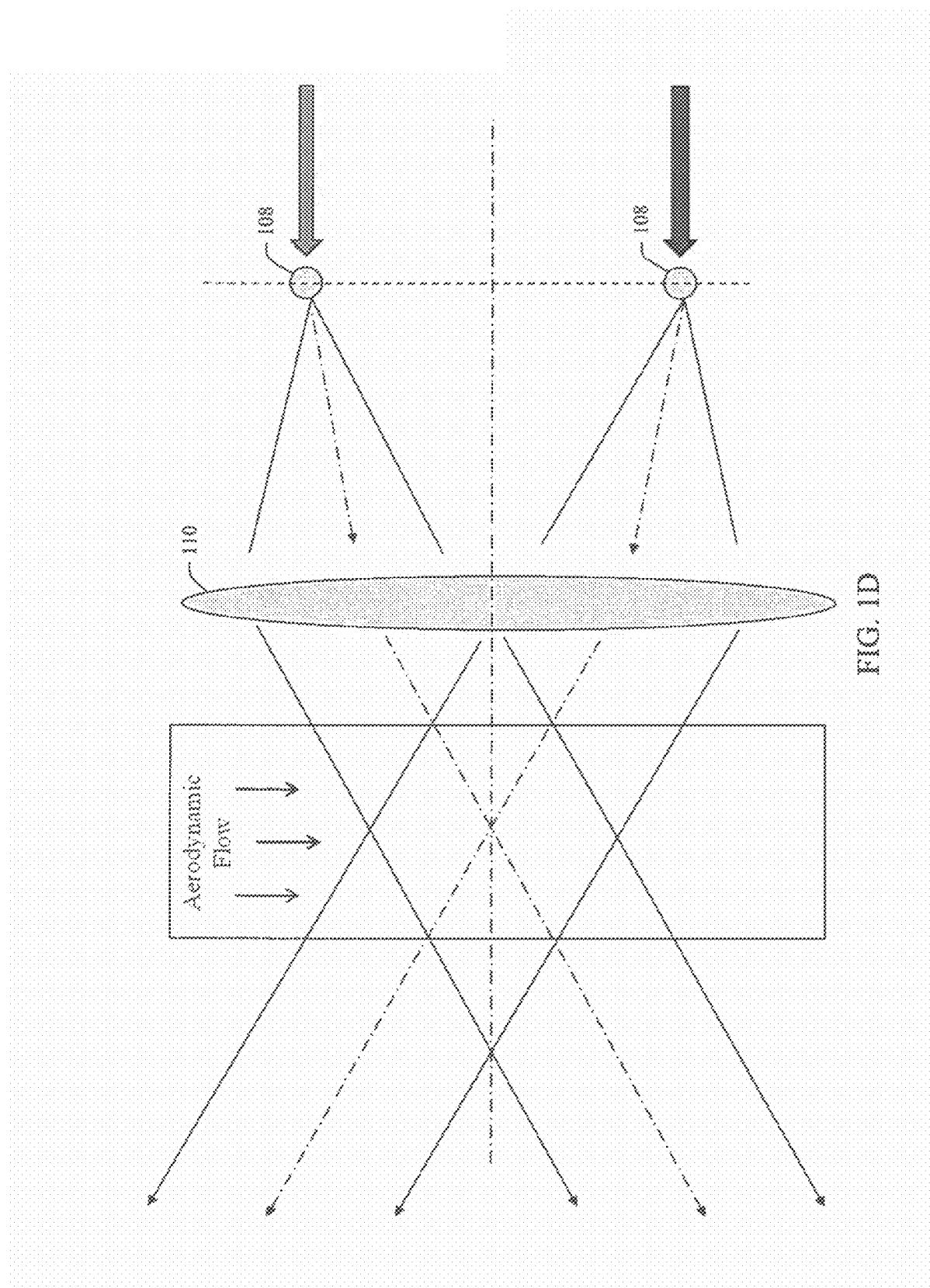
FIG. 1D illustrates the generation of two sheets of light in one plane.
Figure 1E:
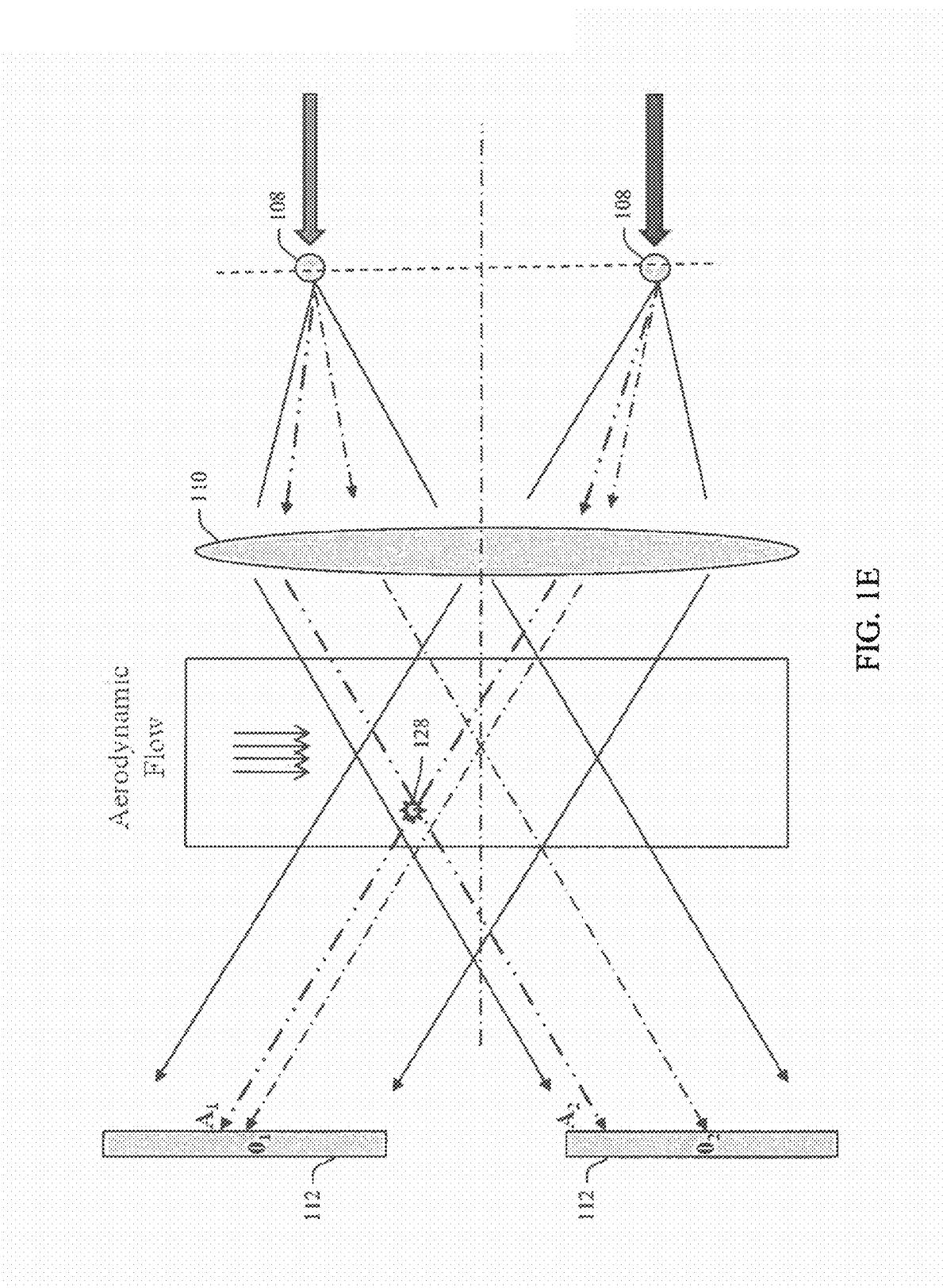
FIG. 1E illustrates an embodiment that can use the parallax phenomenon generated by two sheets of light to evaluate locations of inhomogeneities in aerodynamic flows including shocks in the direction normal to the aerodynamic flow.

FIG. 1D illustrates the generation of two sheets of light in one plane and passage of the sheets through the aerodynamic flow. In some embodiments, multiple sheets of light can be sent through the aerodynamic flow under angles to the flow direction. Such an arrangement can be utilized to take advantage of the phenomenon called "parallax," which can be used for depth perception. FIG. 1E illustrates an embodiment that can use the parallax phenomenon generated by two sheets of light to evaluate locations of inhomogeneities in aerodynamic flows including shocks in the direction normal to the aerodynamic flow. FIG. 1E shows an inhomogeneity 128 in the aerodynamic flow and its projections $A_1$ and $A_2$ on two photodetectors 112, or two regions of a single photodetector. The location of the inhomogeneity 128 in the direction transverse to the aerodynamic flow can be retrieved from the geometry of the embodiment and the difference in coordinates $O_1A_1$ and $O_2A_2$. Furthermore, the two pencil beams used in such an embodiment can have different wavelengths and the multiple photodetectors or multiple regions of a single photodetector can be equipped with filters or other devices to increase selective sensitivity of the photodetectors or regions to the corresponding wavelengths from the two pencil beams. The configuration illustrated in FIG. 1D and FIG. 1E can be constructed in horizontal, vertical, or both planes.

Figure 1F:
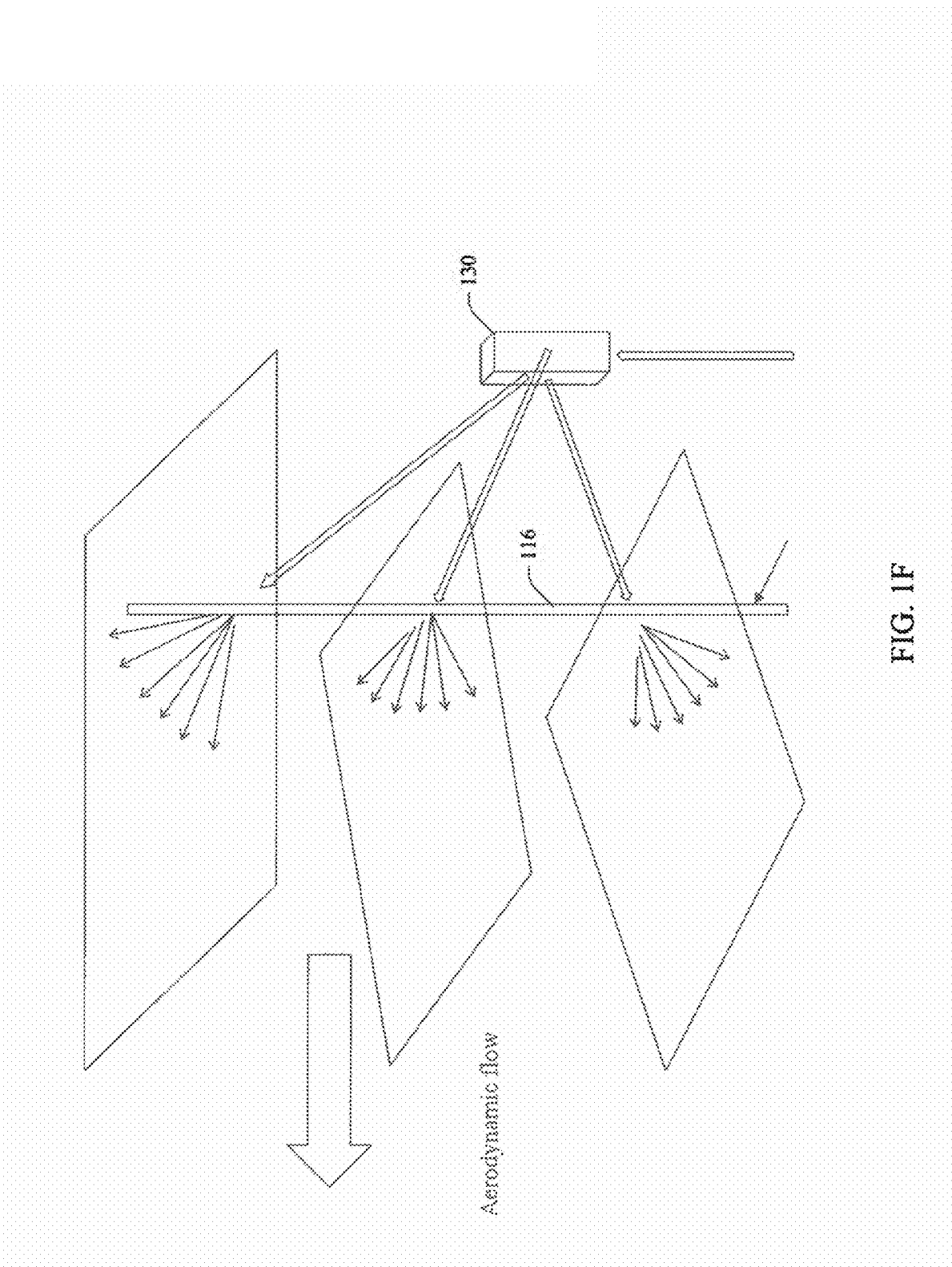
FIG. 1F illustrates an embodiment wherein multiple sheets of light are generated.

FIG. 1F illustrates an embodiment wherein multiple sheets of light are generated. In FIG. 1F, the initial pencil beam can contain two or more wavelengths. These multiple wavelengths can be present simultaneously in time. These wavelengths can also appear in time-sequential manner. The configuration of an embodiment such as that depicted in FIG. 1F is similar to that shown in FIG. 1C. However, as shown in FIG. 1F, the beam splitter element 124 of FIG. 1C may be replaced by spectral element 130, and direction manipulation elements 126, depicted in FIG. 1C, need not be included. Spectral element 130 can be a diffraction grating, spectral prism, or other optical element that disperses light in space according to the wavelength. Spectral element 130 can produce two or more individual pencil beams carrying light at different wavelength. Those individual pencil beams can impact the light sheet generator 116 (e.g., diffraction element 108) at different angles and produce sheets of light of different wavelengths (color). The sheets of light of different wavelengths are in different planes. The planes can be parallel to direction of the flow. FIG. 1F illustrates an embodiment wherein the initial pencil beam, individual pencil beams with different wavelength, and the light sheet generator 116 (e.g., diffraction element 108) are all located in one plane.

In some embodiments, the directions of the individual pencil beams can be changed, for example, by including direction manipulation elements 126 such as those shown in FIG. 1C. Depending on the embodiment, the planes that carry sheets of light of different wavelengths can be parallel to each other. In general, planes can be at any angle to each other and can be parallel to or at another angle to the direction of the aerodynamic flow.

Figure 2:
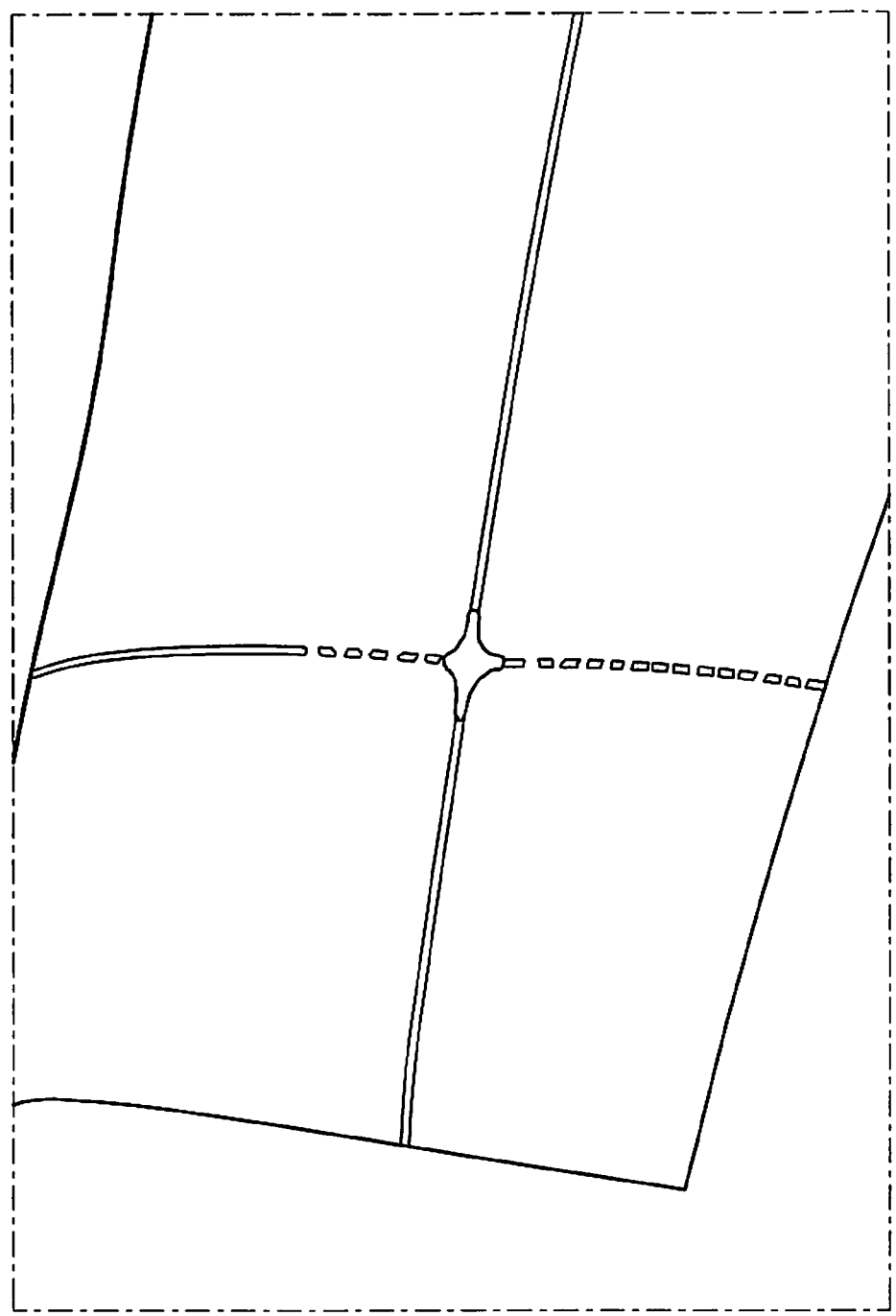
FIG. 2 illustrates laser sheets generated by two orthogonally positioned wires.

FIG. 2 illustrates laser sheets generated by two orthogonally positioned wires. Additional wires or wires in different arrangements can generate different configurations of laser sheets. Furthermore, different elements may be substituted for wires as diffraction element 108 (e.g., slits, etc.). In one embodiment, optical element 110 of FIG. 1A is a lens and diffraction element 108 is placed in the central focal point of the lens. In an alternative embodiment, diffraction element 108 may be located in the focal plane (not shown) of optical element 110 without necessarily being located at its central focal point.

Figure 3:
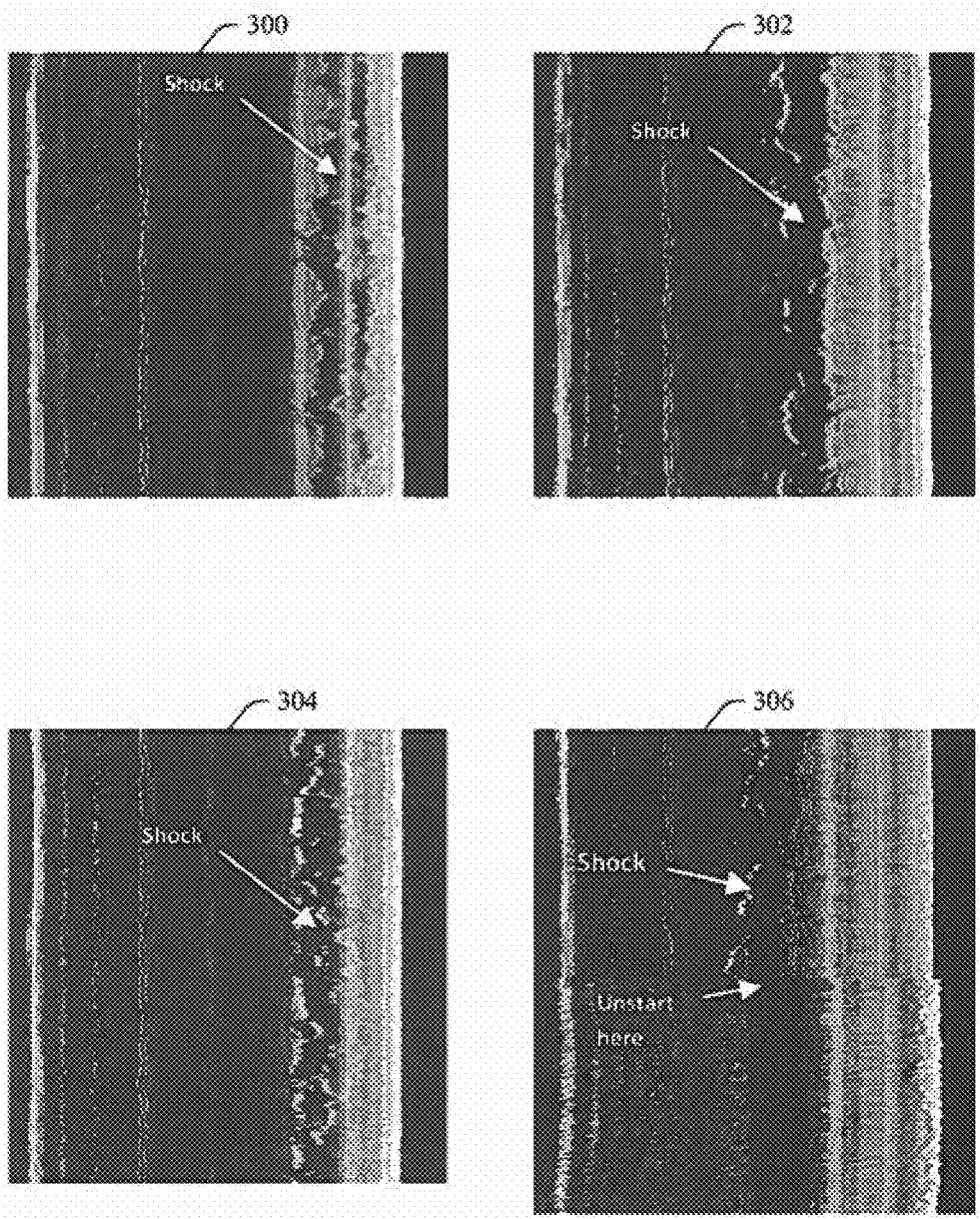
FIG. 3 illustrates results obtained by a shock sensing system utilizing a laser sheet.

FIG. 3 illustrates results obtained a shock sensing system utilizing a laser sheet. These results were obtained during wind tunnel testing using a system similar to that described above in connection with FIG. 1A. Images 300, 302, and 304 illustrate detection of shocks at a Reynolds numbers of 7.5 and angles between a test object and the incident air flow of 9.50°, 9.65°, and 9.80°, respectively. Image 306 depicts an observed transition from a steady shock to an unstart condition. In each of images 300, 302, 304, and 306, the direction of air flow was from the left of the image to the right.

Figure 4:
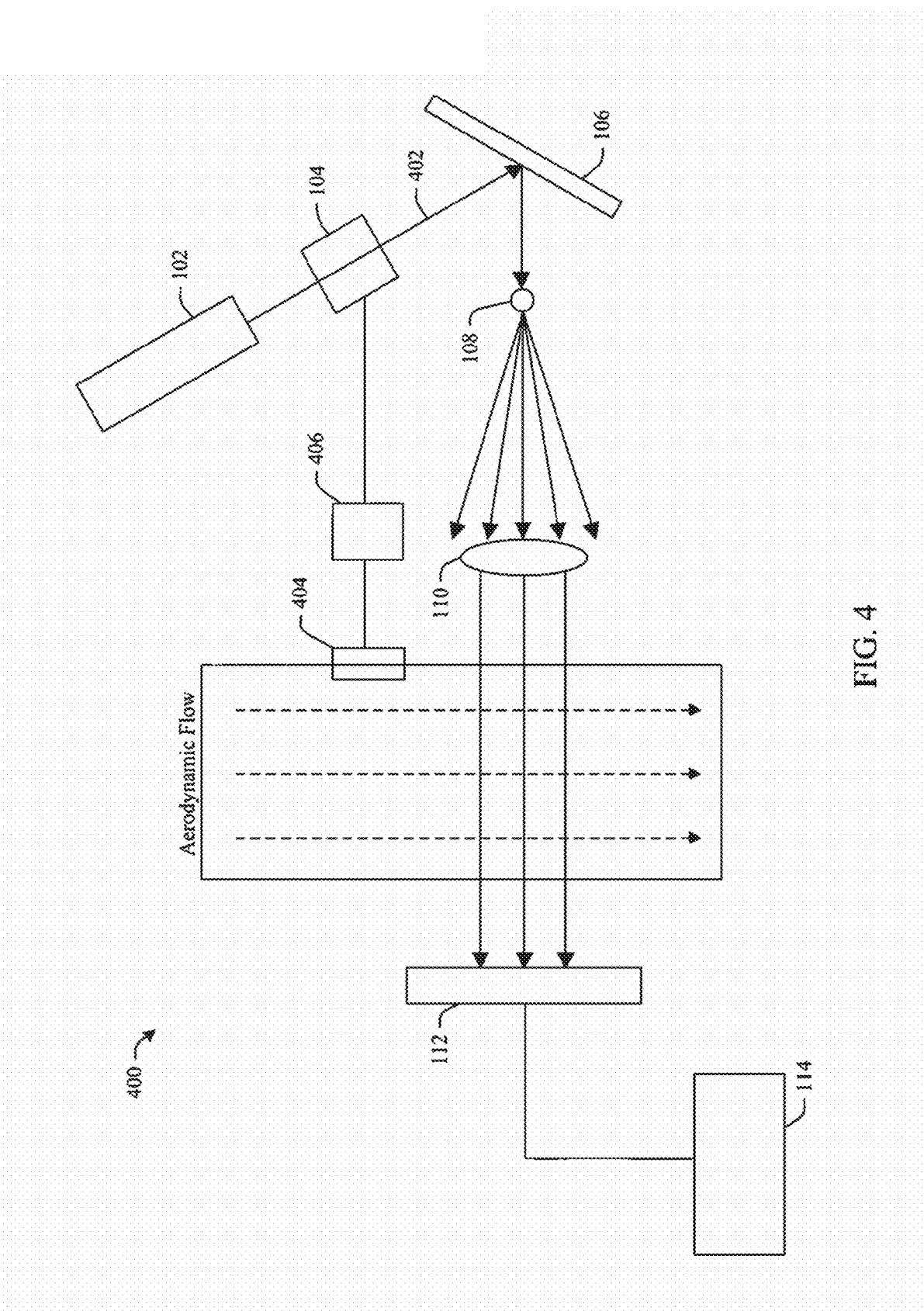
FIG. 4 illustrates an example embodiment of the shock sensing system with a variable diameter pencil beam.

FIG. 4 illustrates an embodiment of an example shock sensing system 400 with a variable diameter pencil beam 402. As explained further below, at higher altitudes, the pressure usually decreases and the mean free path increases, which can cause increased shock thickness and decreased shock strength. However, appropriate changes in the pencil beam diameter will produce diffraction patterns similar to those observed at near atmospheric pressures.

System 400 can be similar to system 100 of FIG. 1A, and embodiments discussed above in connection with system 100 and FIG. 1A may also be employed with system 400. In system 400, beam alignment element 104 can be selected such that it can change the diameter of variable diameter pencil beam 402 in a prescribed manner. For example, beam alignment element 104 can be a beam magnifier or optical collimator with a variable magnification. System 400 can additionally comprise a pressure sensor 404 that can detect pressure in an area where shocks may occur (e.g., an aerodynamic flow in the inlet of an aerospace vehicle, a wind tunnel, etc.). Pressure sensor 404 can be coupled to a magnification controller 406. Magnification controller 406 can receive pressure readings from pressure sensor 404 and determine an appropriate magnification based at least in part on the detected pressure. For example, magnification controller 406 can apply one or more known algorithms (e.g., based on modeling, testing, etc.) to the detected air pressure in order to select a magnification. Based on the selected magnification, magnification controller 406 can transmit a control signal to beam alignment element 104. In response, beam alignment element 104 can change the diameter of variable diameter pencil beam 402 in accordance with the selected magnification. Optionally, at least one of pressure sensor 404 or magnification controller 406 may communicate pressure readings or the selected magnification to processor 114 in order to facilitate signal processing.

Detection and localization of aerodynamic inhomogeneities (e.g., shocks) may be better appreciated by way of theoretical analysis and experimental results described herein. It is to be understood that inhomogeneity is a property of matter that changes in space, time, or both. In a particular example, a density inhomogeneity involves a density that changes in space, time, or both.

Phenomena of light propagation through inhomogeneous media can be described by the electromagnetic field theory expressed by the Maxwell equations and by diffraction and scattering theories known from physics and optics. In areas where an incident optical beam encounters boundaries or interfaces between media with different refractive indices diffraction may occur. The geometrical theory of diffraction has been well described and extended to semitransparent smooth and straight edge objects. According to the theory, an incident beam represented by a plane wave and passing through or near such diffracting interface may be thought of in three parts. One of them continues its propagation in the medium it was originated in, the second one enters into the medium with a different refractive index and experiences reflection and refraction according to Snell's Law. The third part of the incident beam experiences diffraction. All three parts interfere with each other forming characteristic scattering patterns.

If the incident beam is not a plane wave but, for instant, a Gaussian beam, then the amount optical power confined within the beam is distributed between the above three parts according to the relative dimensions of the scatterer and beam. For instance, for a case when the scatterer is an opaque wire, the intensity distribution in the diffraction pattern will depend on relative diameters of the wire and incident beam. For a case when the scatterer is a semi-transparent optical fiber, for a portion of the beam that passes through it, the fiber acts as a lens. For a case when the diameter of the semi-transparent fiber is greater than the incident beam diameter the entire beam with the exceptions of losses due to reflections and internal scattering can pass through the fiber and form a light-sheet-like image. The angle at which this sheet-like image is seen is small. Therefore, in order to cover a reasonable section in the inhomogeneous aerodynamic flow, the fiber has to be placed at a great distance from the flow. This phenomenon can be magnified by using optical fibers with cross-sections other that circular. However, due to small dimensions of both the beam diameter and fiber, the paraxial approximation makes this phenomenon insignificant.

As described herein, in alternative aspects, the underlying physics of the phenomenon can remain the same even when the incident plane wave is replaced by a Gaussian beam. The resultant patterns, however, are different. The differences have been shown mathematically for the case of Fraunhofer diffraction of a Gaussian beam (wave field) by a thin wire and dielectric cylinder as well as propagation of Gaussian beams through inhomogeneous media with shock-like profiles of refractive index. The analysis (including mathematical analysis) has shown splitting of the incident Gaussian beam, redistribution of intensities between diffraction peaks, formation of multiple fringes and beam spreading.

In physics and engineering, a wave can be understood as a time dependent directional phenomenon of propagation of disturbances in space. The disturbances can be electromagnetic, acoustical, thermal, gravitational, or other fields. The waves may be characterized by their amplitudes and phase distributions. Electromagnetic waves can also be characterized by polarization. To account for the presence of the phase, the mathematical expression for a wave usually has real and imaginary components. Waves usually are not restricted in space; however, their intensities can be zero at infinity. For example, a Gaussian wave in a 3-dimensional space (x, y, z) and time t can be expressed by equation 1:

$$E(r, z, t) = E_0 \frac{w_0}{w(z)} e^{j\varphi(z)} e^{-jkz} e^{-\frac{r^2}{w^2(z)}} e^{-jk\frac{r^2}{2R(z)}} e^{j\omega t} \quad (1)$$

where:
$E_0 = |E(0,0,t)|$ is the maximum amplitude;
$2w_0$ is the minimum waist diameter;

$$w(z) = w_0 \sqrt{1 + \frac{z^2}{z_R^2}}$$

is half the waist diameter at a distance z along the direction of beam propagation;
r is the radial distance from the beam, the distance in the XY plane normal to the direction of the beam propagation Z (i.e., $r^2 = x^2 + y^2$);

$$Z_R = \frac{\pi w_0^2}{\lambda}$$

is the Rayleigh range;
k is the propagation constant;
ω is the angular frequency of the wave;

$$\varphi(z) = \tan^{-1}\left(\frac{z}{Z_R}\right)$$

is the longitudinal phase delay;
R(z) is the radius of curvature of the wavefronts comprising the beam; and
$\lambda = \lambda_0/n$ is the wavelength.

Beams can be characterized by a propagation of energy carried by the corresponding waves in a certain direction and defined by certain spatial restrictions. For instance, a column of light can be called a "beam" because of the directionality and confinement. Because Gaussian waves do not spread significantly in the plane normal to the direction of their propagation and are confined to a relatively restricted space around that direction, the word "beams" is usually used to describe them. In order to avoid confusion, a distinction will be made where necessary if the discussion refers to Gaussian waves with a specific mathematical description of their properties or to Gaussian beams with a corresponding description of their intensity distributions. A time-averaged Gaussian beam intensity distribution can be mathematically described by equation 2:

$$I(r, z) = I_0 \left(\frac{w_0}{w(z)}\right)^2 e^{-\frac{2r^2}{w^2(z)}} \quad (2)$$

where: $I_0 = I(0,0)$ is the intensity at the center of the beam at its waist.

In view of these theories, an inhomogeneous medium may be described as having interfaces that separate regions having a uniform refractive index. As illustrated herein, when light encounters the interfaces it experiences effects such as diffraction, scattering and other effects. The strength of the effects depends on a number of factors including the type of interface.

The interfaces may be classified as abrupt, continuous, or mixed. Abrupt interfaces exhibit a relatively rapid change or jump in the refractive index. For example, surfaces of glass components in conventional optical systems could be characterized as abrupt interfaces. In continuous interfaces, the index of refraction changes gradually, or in a distributed fashion. The qualifying factor for this type of interface is that the observer need not visualize the homogeneous parts of the medium and, from the measurements, the medium is perceived to be continuously inhomogeneous. Familiar examples of gradual or distributed interfaces include water in the ocean and the Earth atmosphere. It is to be understood that water in the ocean has a higher temperature at the surface than at the bottom and, as a result, a refractive index gradient. Variations in salinity also affect the refractive index of water. In another example, the Earth atmosphere has air density that varies with the altitude. Media with mixed interfaces have distinct areas where, for all practical purposes, they could be treated as homogeneous. For at least this reason, the mixed interfaces can be characterized by width or thickness of inhomogeneous layers between homogeneous areas.

Each time an electromagnetic field encounters an obstacle it experiences scattering and diffraction. Scattering can be understood as a physical phenomenon associated with changes in properties of electromagnetic or other waves as a result of their interactions with the media they propagate through. Diffraction, on the other hand, can be understood as an approximation in which the results of the wave propagation through a medium are observed on a screen with linear dimensions much smaller than the distance from the screen to the diffracting (or scattering) element. Diffraction could be regarded as a detail view of a scattering pattern in a given direction through a narrow viewing angle. In accordance with this example, the scattering pattern depends on three factors, the scatterer (its geometry, material, surface quality, etc.), the incident electromagnetic field (wavelength, bandwidth, polarization, geometry, etc.) and the location of the observer (screen, camera, etc.).

Experimental Setup #1

Figures 5A, 5B:
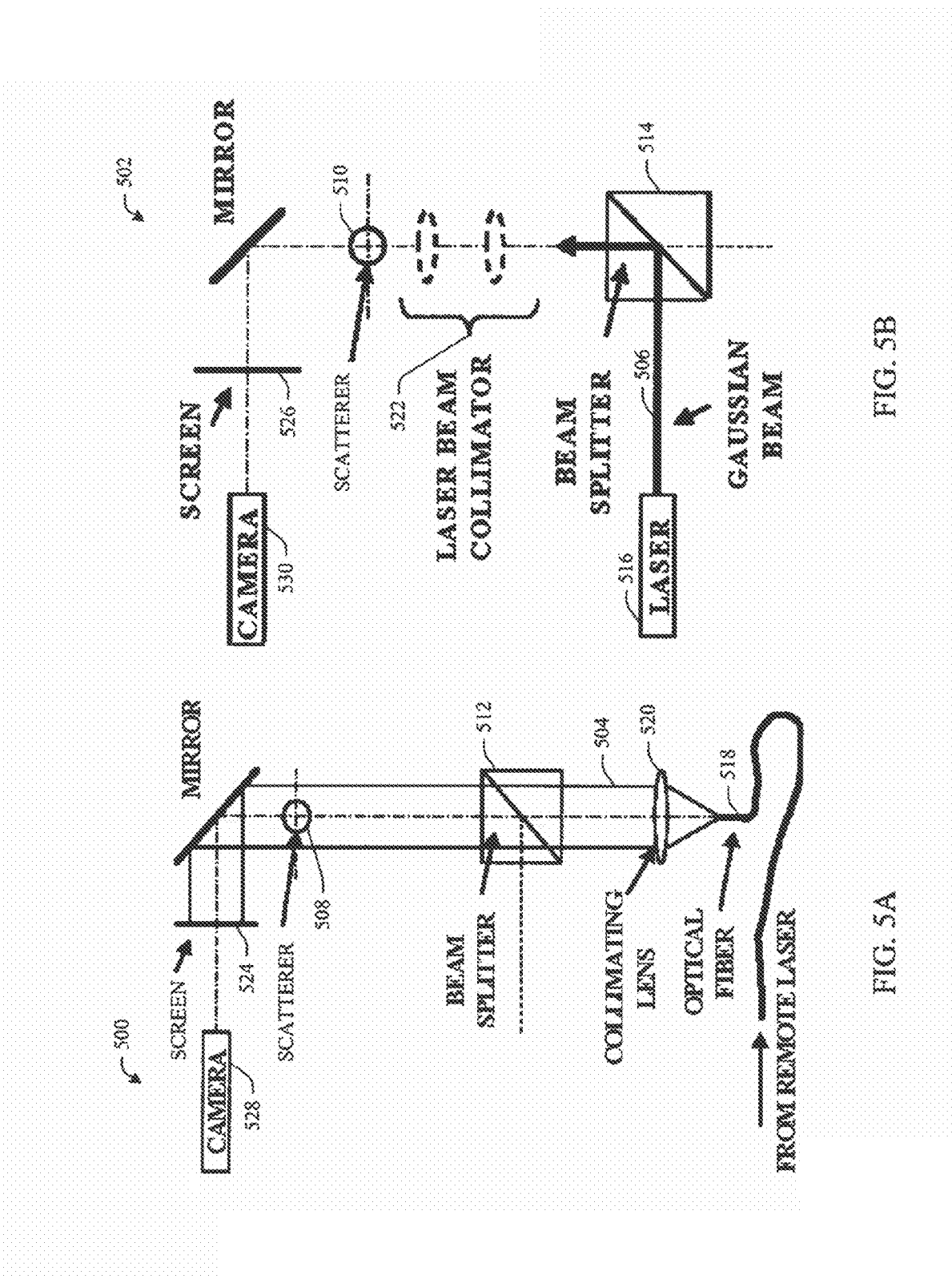
FIG. 5A illustrates an example schematic arrangement of an experimental setup used to study interaction of an optical beam with a scatterer.
FIG. 5B illustrates another example schematic arrangement of an experimental setup used to study interaction of an optical beam with a scatterer.

FIGS. 5A and 5B illustrate example schematic arrangements of experimental setups 500 and 502 used to study interactions of optical beams 504 and 506 with scatterers 508 and 510. The following discussion of experimental setups and results is provided to add perspective to the innovation and is not intended to limit the scope of this specification and claims appended hereto. The first discussion that follows is directed to detection of shocks. Thereafter, the specification discloses systems and methods to localize or identify location of the shock.

In accordance with the experiments, dielectric fibers and cylinders were selected as abrupt interfaces to be scatterers 508 and 510 and placed in the paths of optical beams 504 and 506. Although for purposes of explanation FIGS. 5A and 5B are depicted as separate setups and can be utilized as such, for purposes of the experiment they were combined into a combination of the two setups with different illuminating optical beams 504 and 506. The separate setups can readily be combined into a common setup by virtue of the inclusion of beam splitters 512 and 514 in experimental setups 500 and 502. FIG. 5A illustrates the first setup 500, which used a relatively large diameter (about 5 mm) collimated optical beam 504, and FIG. 5B illustrates the second setup, which employed a HeNe laser that emitted a Gaussian beam 506 with about 0.5 mm diameter at the exit aperture of light source or laser 516.

In the setup shown in FIG. 5A a large diameter incident beam 504 was generated by light emitted from the tip of a single mode fiber 518 placed in the focal plane of a collimating lens 520. A remotely located laser (not shown) served as an initial light source.

Turning to FIG. 5B, in the experimental setup, the beam 506 emitted from the laser 516 had a Gaussian profile meaning that its diameter increases with the distance. Also, for the purpose of collimating a narrow Gaussian beam, a laser beam collimator 522 was incorporated in the path after a beam splitter 514. The arrangement permitted propagation of both narrow Gaussian laser beams (e.g., an expanding Gaussian laser beam and a collimated one) without changes in the rest of the setup.

As stated supra, for experimental purposes, both setups shown in FIGS. 5A and 5B were combined in one. In the combined setup both beams, the large diameter collimated beam 504 and the narrow Gaussian laser beam 506, had a common path from the beam splitter 512 and 514 to the screen 524 and 526. Such an arrangement permitted a compatibility of setups and consistency in measurements.

In one version of the experiment, fibers and cylinders were selected as scatterers 508 and 510. The optical beams 504 and 506 struck the scatterers 508 and 510 normally to their respective long axis. The observed scattering patterns from scatterers 508 and 510 were observed and recorded on screen 524 and 526 or by camera 528 and 530.

In another configuration, the combined experimental setup used an optical fiber as a scatterer 508 and 510. During the experiment the beams 504 and 506 were used independently where each of the beams 504 and 506 traveled its own path. Moreover, when one of the beams 504 and 506 was used, the other one was blocked. Scatterer 508 and 510 (e.g., a fiber or a cylinder) was placed in the common path for both beams 504 and 506 and the scattered light was observed on the screen 524 and 526. The common path between the scatterer 508 and 510 and the screen 524 and 526 was about 485 mm long. The fiber holder (not shown), designed to accommodate optical fibers of different diameters, was placed on a translation stage (not shown). The laser beam collimator 522 was used with the Gaussian beam 506 from the laser 516, but not with the large diameter beam 504 from optical fiber 518.

Figure 6:
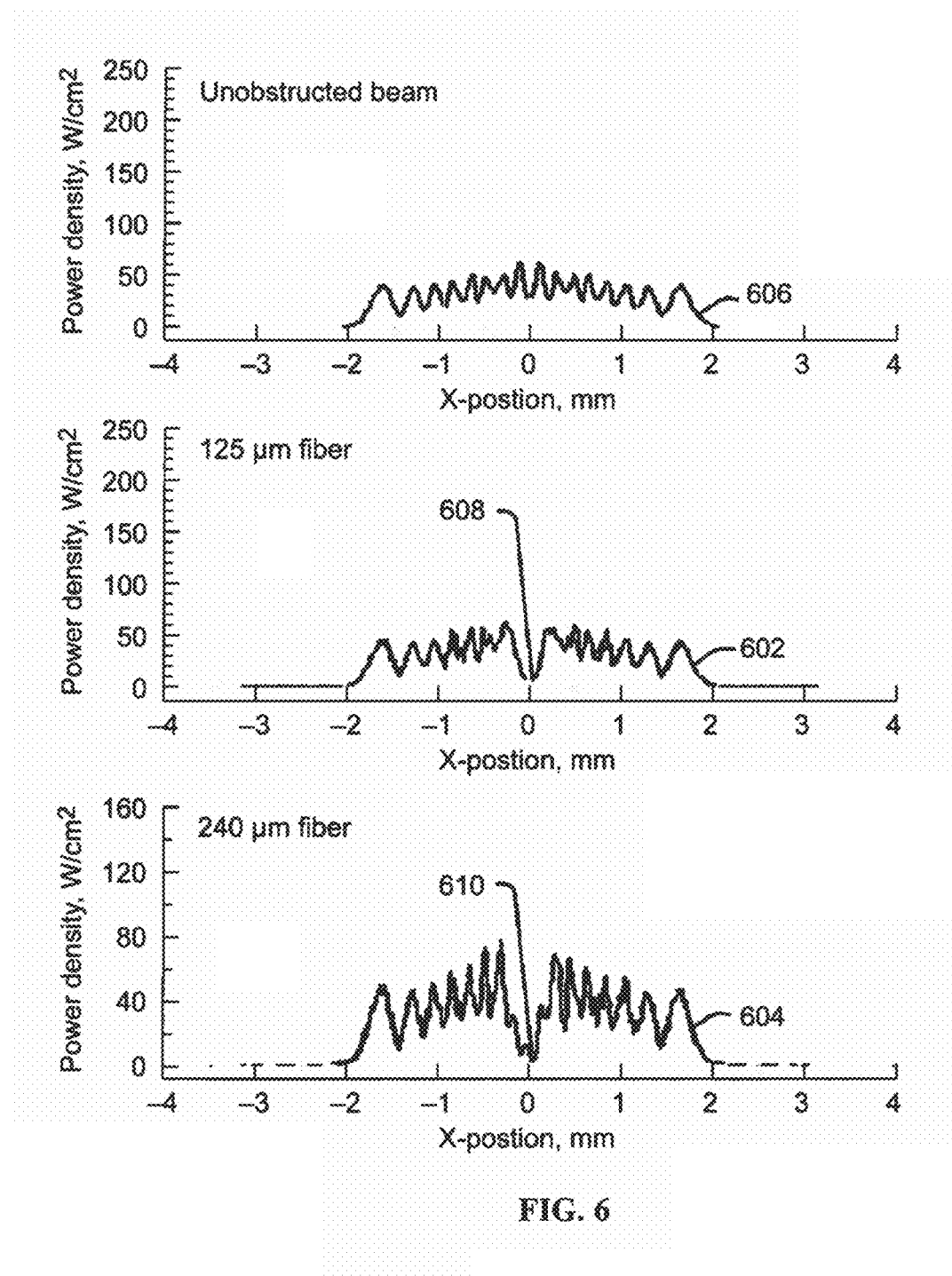
FIG. 6 illustrates results of images obtained from an experimental setup used to study interaction of an optical beam with a scatterer.

Glass fibers with outer diameters 125 and 240 μm were used as scatterers 508 and 510. First, optical fibers were put in the configuration setup 500 illustrated in FIG. 5A and images of patterns generated on the screen 524 were recorded. FIG. 6 illustrates the results of images 602 and 604 obtained with the 125 and 240 μm fibers, respectively, along with an image 606 of the unobstructed beam. The images in FIG. 6 were obtained by removing the screen 524 in FIG. 5A and viewing the image directly with a beam viewing camera 528 that provided a direct recording of patterns of scattered light. A characteristic dip 608 and 610 in the middle of the results of images 602 and 604 obtained with fibers suggests the presence of a typical shadowgraph visualization phenomenon.

Figure 7:
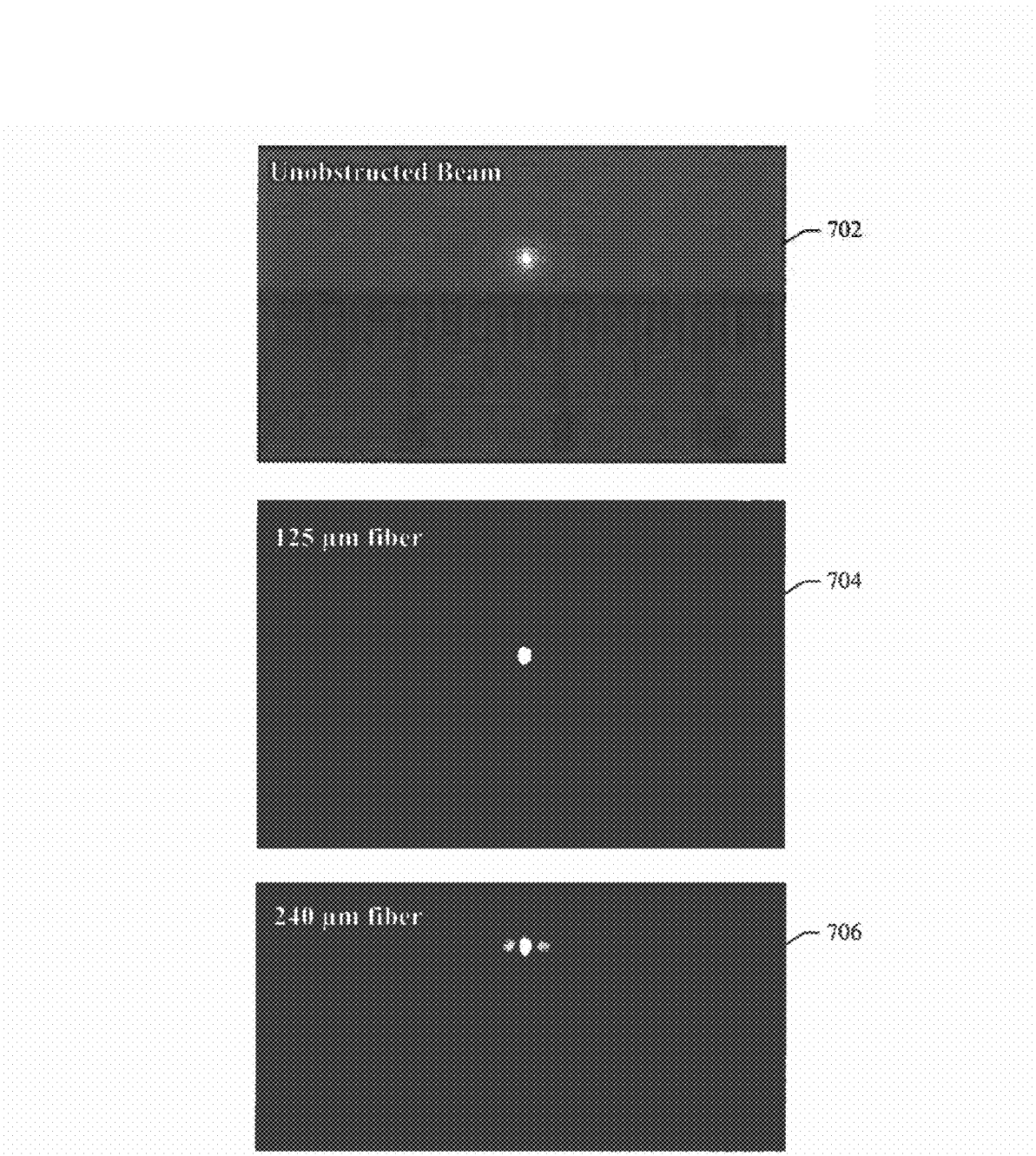
FIG. 7 illustrates patterns generated as a result of interactions between a narrow Gaussian beams and fibers employed as a scatterer when observed on a screen.
Figure 8:
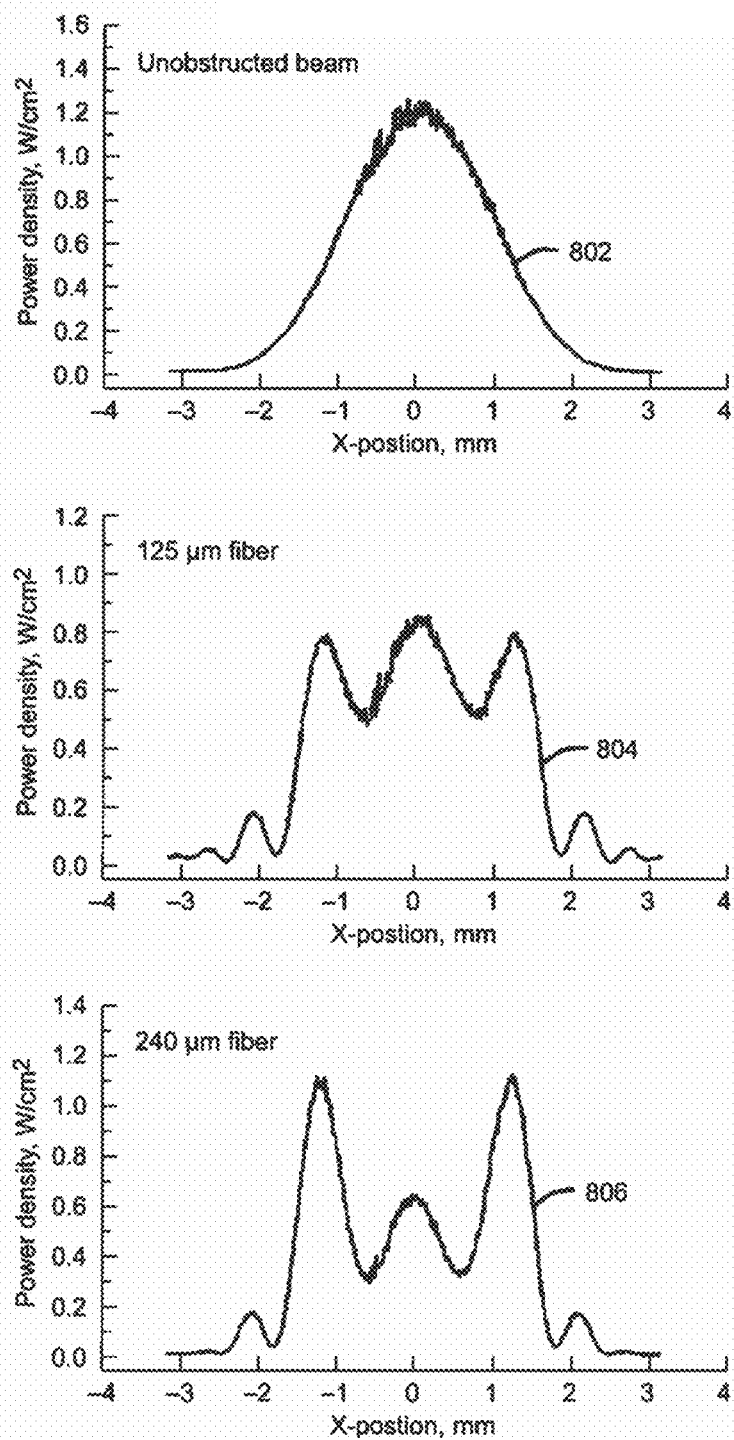
FIG. 8 illustrates intensity distributions of patterns generated as a result of interactions between a narrow Gaussian beams and fibers employed as a scatterer when observed on a screen.

FIGS. 7 and 8 depict patterns generated as a result of interactions between a narrow Gaussian beams 506 and fibers employed as scatterer 510 when observed on screen 526. As illustrated, when the diameter of the incident beam gets smaller the patterns become significantly different. The patterns were obtained by placing the fibers as scatterer 510 in setup 502 as shown in FIG. 5B at a distance approximately 890 mm from the exiting aperture of the laser 316. FIG. 7 shows an image 702 of the unobstructed beam 506 as well as scattering patterns 704 and 706 generated by a 1.5 mm diameter collimated Gaussian beam 506 on 125 and 240 μm diameter optical fibers acting as scatterer 510. FIG. 8 illustrates the intensity distribution 802 of the unobstructed beam, the intensity distribution 804 when the 125 μm diameter optical fiber acted as scatterer 810, and the intensity distribution 806 when the 240 μm diameter optical fiber acted as scatterer 510. To obtain the results shown in FIG. 8, the incident beam 506 was a non-collimated Gaussian. In the plane where the optical fibers acting as scatterer 510 were located the laser beam 506 had a diameter of approximately 2.7 mm.

It is to be appreciated that, based on comparisons of FIGS. 6, 7, and 8, interaction of a small diameter laser pencil beam such as Gaussian beam 506 with thin obstacles such as an optical fiber used as scatterer 510 is accompanied by formation of patterns different from conventional shadowgraphs. FIGS. 7 and 8 demonstrate an increase in the dimension of the scattering patterns 704 and 706 and intensity distributions 804 and 806 when compared with the dimension of the unobstructed beam 702 or 802 and formation of multiple spots in scattering patterns 704 and 706 and intensity distributions 804 and 806. The increase is visibly larger in the case of a smaller diameter collimated beam. The intensity distributions 804 and 806 are close to theoretical predictions in accordance with the innovation.

Returning to FIG. 5B, setup 502 was also used to investigate scattering of narrow laser beams from cylindrical surfaces. For this experiment a 0.5 inch diameter plastic cylinder with polished cylindrical surface was selected to act as scatterer 510.

Figure 9:
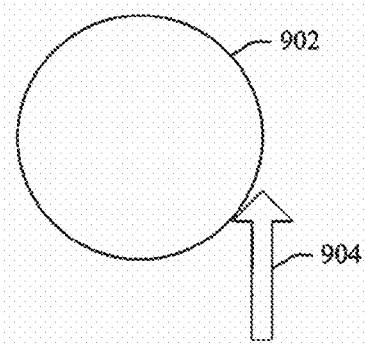
FIG. 9 illustrates an example schematic representation of the interaction between a laser beam and a semitransparent cylinder.
Figure 10A:
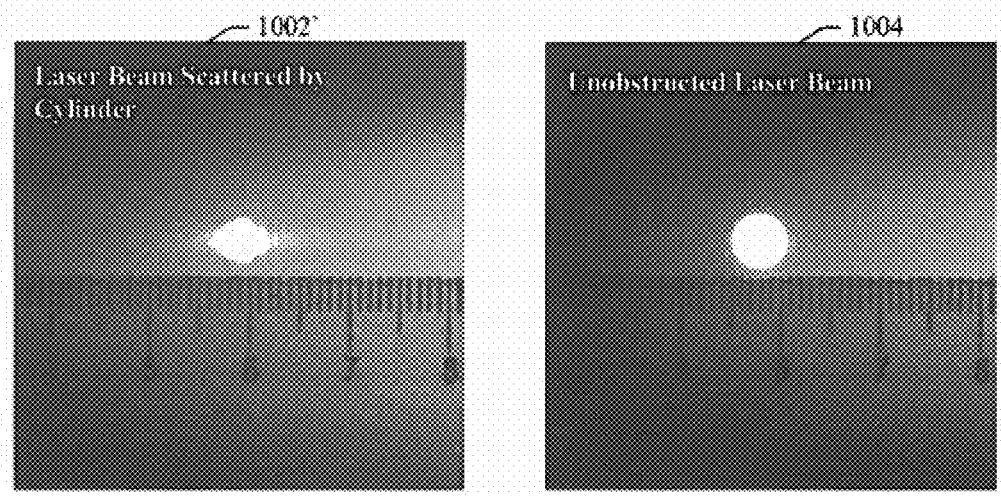
FIG. 10A illustrates a resulting scattering pattern of an incident laser beam from a semitransparent cylinder.
Figure 10B:
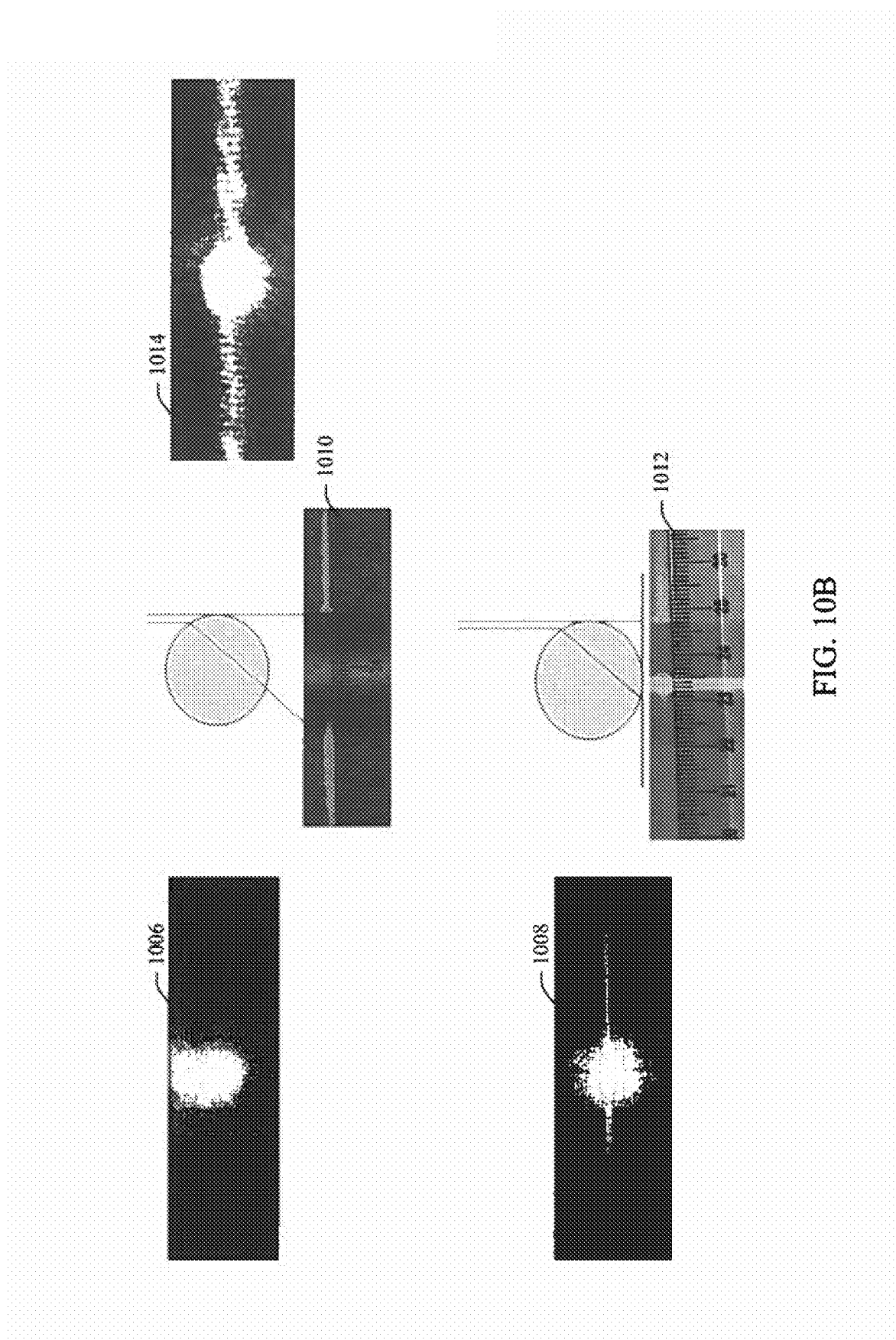
FIG. 10B illustrates a comparison of scattering patterns of an incident laser beam on various interfaces.

FIG. 9 illustrates an example schematic representation of the interaction between a laser beam 902 and a cylinder 904. The incident laser beam 902 was sent at a grazing angle to the surface of the cylinder 904 normal to its main axis. FIG. 10A shows the resulting scattering pattern 1002 of the incident laser beam 902 from the cylinder 904. For purposes of comparison, the image of the unobstructed beam 1004 is also shown. FIG. 10B illustrates a comparison of scattering patterns of an incident laser beam on various interfaces. Image 1006 shows an unobstructed beam and image 1008 of scattering by an aerodynamic shock. Interaction of a beam with a cylinder can be seen in images 1010 and 1012, demonstrating that the high refractive index of the cylinder's material causes the refracted portion of the beam to spread too far to the left when compared with image 1008 of scattering by an aerodynamic shock. Image 1014 shows a diffraction pattern generated by scattering from an optical fiber. Comparison of image 1008 and image 1014 illustrates that diffraction pattern generated by an optical fiber placed in the path of a small diameter pencil-shaped optical beam is a good approximation for the beam scattering by a shock.

Interaction of Light with an Aerodynamic Flow

Of the three types of interfaces discussed above (abrupt, continuous, and mixed), it will be understood that aerodynamic shocks belong to the mixed type of interfaces. The shock thickness is one of the shock parameters defined as a distance over which the change in air density and the corresponding change in the refractive index occur. Among various models used to determine the value of refractive index across a shock as a function of position x one of the most frequently used is equation 3:

$$n(x) = n_{low} + \frac{\Delta n}{1 + \exp\left(-4\frac{x}{L}\right)} \quad (3)$$

where:
$\Delta n$ is the jump in the refractive index across the shock, $\Delta n = n_{high} - n_{low}$,
$n_{high}$ and $n_{low}$ are maximum and minimum values of the refractive index respectively across the shock, and
L is the shock thickness.

Although shocks are classified as mixed interfaces, experimental measurements of shock front thickness in various gasses at near atmospheric pressures have shown that their values are small enough that they can be treated as abrupt interfaces.

The atmospheric pressure normally decreases with an increase of the altitude. At lower pressures, the mean free path of air molecules increases as the density of the air decreases and the distances between molecules increases. A longer mean free path generally results in a greater shock thickness L. For a flying vehicle passing through various areas of atmosphere with varying atmospheric pressures and corresponding air densities, the shock thickness L (which is defined by the distance over which the change in air density and the corresponding change in the refractive index occurs) changes as well. FIGS. 5A, 5B, 6, 7, 8, 9, 10A and 100B jointly illustrate effects of the beam diameter, diameter of the optical fiber, and difference of refractive indices on the diffraction pattern.

Figure 11:
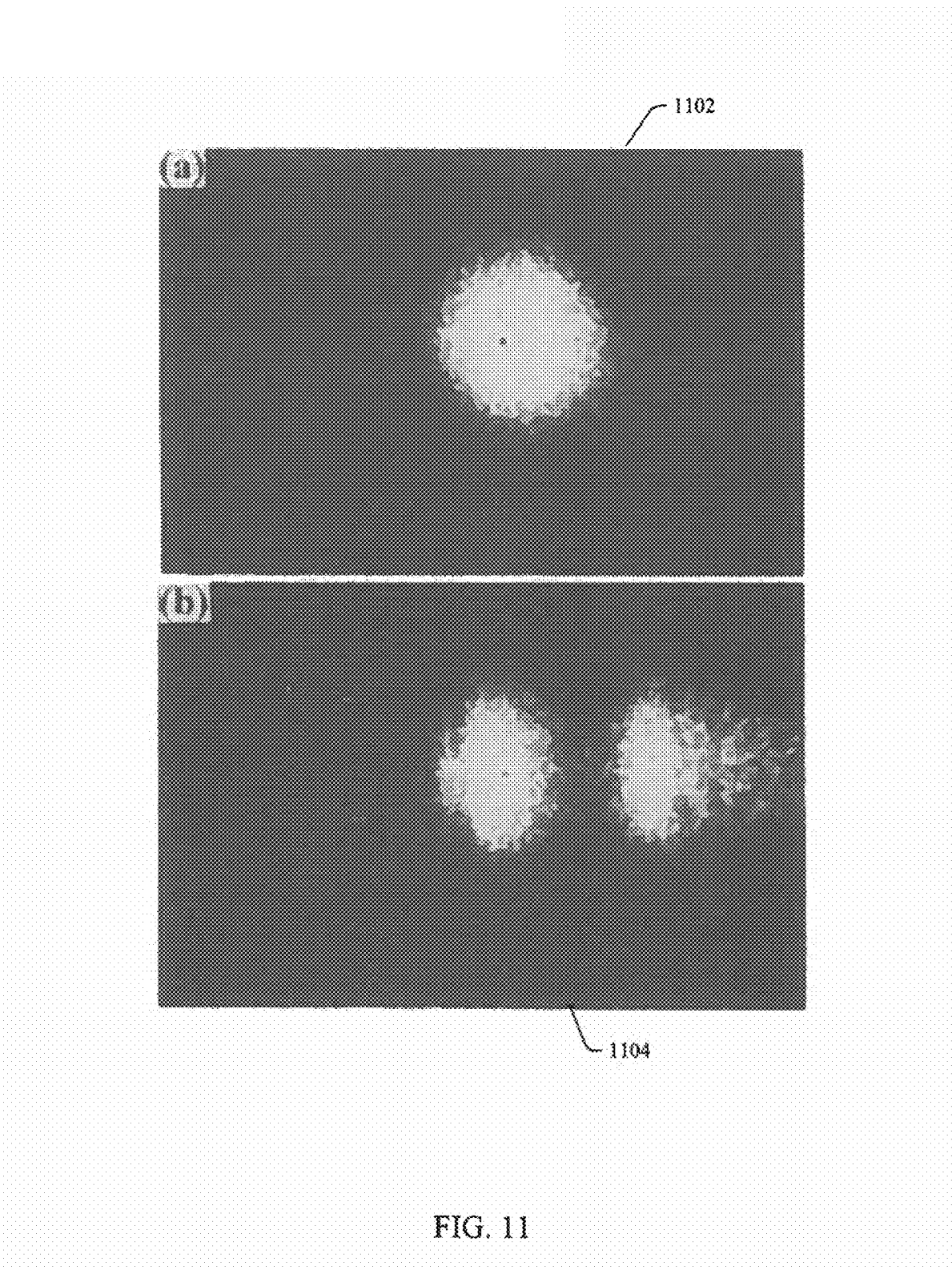
FIG. 11 illustrates a reference image of a pencil beam, as compared with the splitting of a pencil beam based on interaction with a bow shock.

FIG. 11 demonstrates a reference image 1102 of a pencil beam, as compared with the splitting of a pencil beam based on interaction with a bow shock at 1104. As was previously mentioned, every time light interacts with an abrupt inhomogeneity, it diffracts, scatters, and forms interference patterns. Effects associated with propagation of both, large diameter and laser pencil beams, through aerodynamic shocks are similar to those described above. The difference, however, lies is the fact that, in the case of aerodynamic shocks, the change in refractive indexes is very small and could be of the order of $10^{-3}$ depending on pressures on both sides of the shock. The large beam propagation case results in conventional shadowgraph images of shocks. However, closer analysis can reveal other effects, such as, for instance, light interference on bow shocks. Furthermore, splitting of a pencil beam by a bow shock can be observed as shown in FIG. 11.

At higher altitudes the shock thickness usually increases and the shock strength decreases. Appropriate changes in the pencil beam diameter will produce diffraction patterns similar to those observed at near atmospheric pressures.

Figure 12:
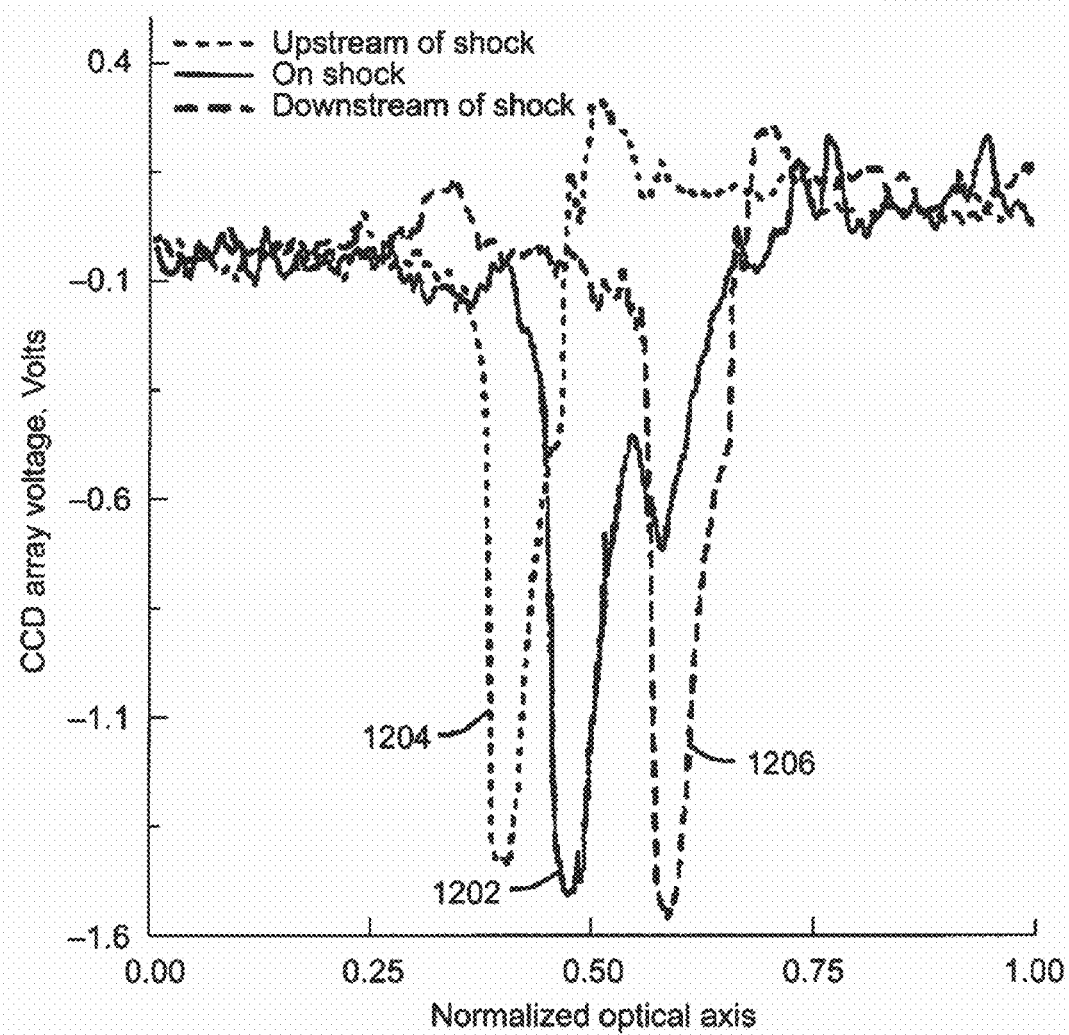
FIG. 12 illustrates results of experiments with laser beams passing through shocks that have been conducted in aerodynamic tunnels.

As illustrated in FIG. 12, results of experiments with laser beams passing through shocks that have been conducted in aerodynamic tunnels demonstrate that after passing through a shock the diameter of a laser pencil beam significantly increases. FIG. 12 exhibits curve 1202 drawn by a solid line, which represents the diameter of the beam after passing through a shock. Curves 1204 and 1206 represent, respectively, cases when the laser beam is either upstream or downstream of the shock.

Figure 13:
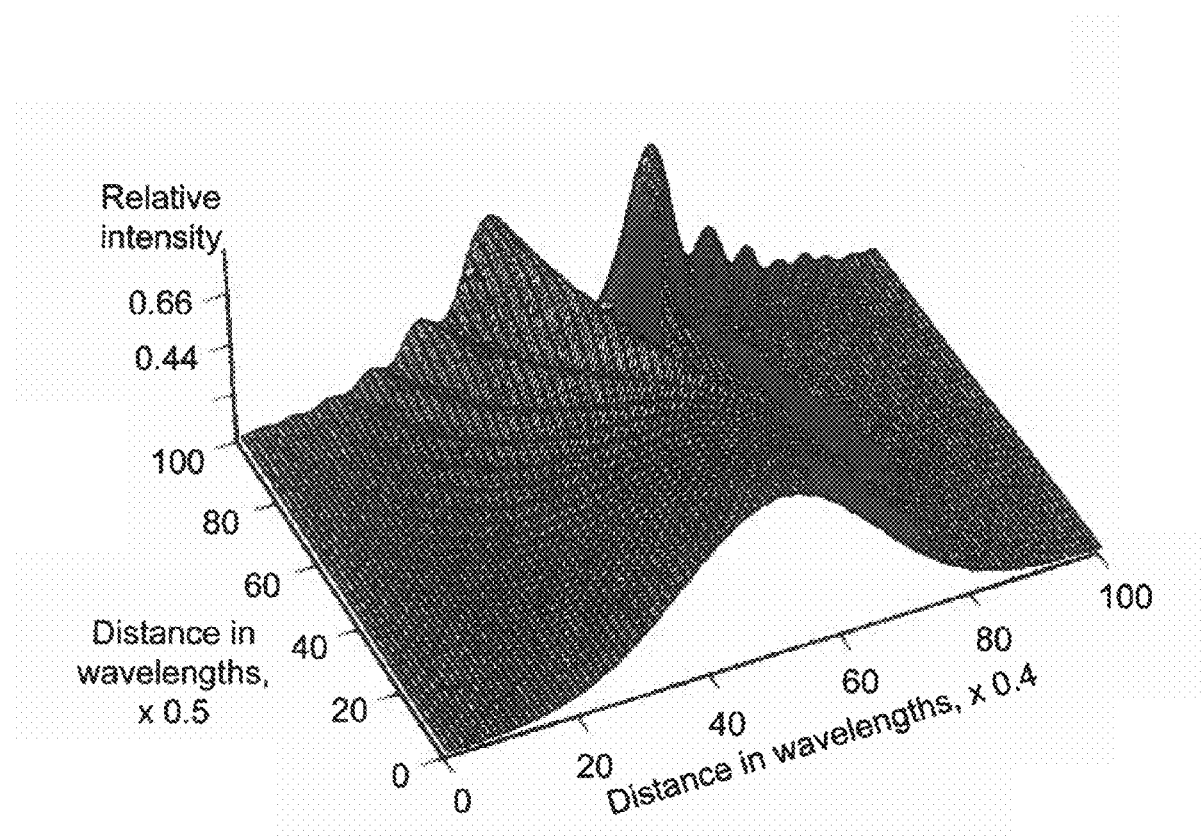
FIG. 13 illustrates computation results of a Gaussian beam propagation through a cylindrical interface with a shock-like profile of refractive index.

Referring now to FIG. 13, computation results of a Gaussian beam propagation through a cylindrical interface with a shock-like profile of refractive index are illustrated. FIG. 13 depicts the result of modeling and computational analysis of a Gaussian beam propagation through inhomogeneities with a shock-like profile using the Finite-Difference Time-Domain (FDTD) method as a computational tool. The FDTD method is a method of computationally analyzing the time-dependent Maxwell equations. Analysis using the FDTD method reveals splitting of a Gaussian beam and formation of interference fringes, in agreement with the results discussed above. The model used to generate FIG. 13 had a relative position of the abrupt interface and the incident Gaussian laser beam similar to those shown in FIGS. 11 and 12. The model used to arrive at FIG. 13 was based on computations involving FDTD methods and equation 3 with $n_{low}$=1.0 and $\Delta n$=0.01. Comparison of FIGS. 11 and 13 demonstrates that there is a similarity in patterns observed experimentally and achieved computationally.

Flow Visualization Using a Scanning Beam

The capability of abrupt and nearly abrupt interfaces to split and distort narrow laser pencil beam may be utilized for flow visualization using a scanning beam. Such a method had several advantages over conventional flow visualization techniques (e.g., interferometry, Schlieren, and shadowgraphy). First of all, in a conventional shadowgraph the light from a light source is delivered to the area where flow inhomogeneities are formed and is spread forming a large diameter collimated beam that fills the entire area of interest. Because the technique requires high power lasers and large optical components it cannot be used in on-board systems without significant weight and real estate penalties. On the other hand, small and lightweight low power sources in the conventional configuration do not generate a signal with a sufficient signal-to-noise ratio at the detector to achieve an adequate resolution. Secondly, the fact that the entire test section has to be illuminated masks the second order phenomena associated with the wave propagation through inhomogeneities. These drawbacks of the conventional systems can be addressed by the subject innovation.

To increase the signal to noise ratio of the detection systems without increase in the laser power, flow visualization can be accomplished via a small diameter scanning pencil beam or pencil-shaped column of light. In the process of passing through a test section the scanning beam can generate a pattern that may be observed or recorded in a timely fashion. A laser used for this purpose can have relatively low yet sufficient power to make the changes in the pattern detectable.

In addition, the pencil beam scanning technique of the innovation permits observation of light diffraction and scattering from inhomogeneities. Diffraction of a nearly plane wave from a bow shock has been observed, as has splitting of the laser pencil beam and formation of secondary peaks. Observations of these phenomena have been enabled by the narrow pencil beam. Also, weak secondary phenomena, such as the scattering and diffraction, occur outside of the boundaries of the incident pencil beam and are easily visible against a dark background.

Figure 14A:
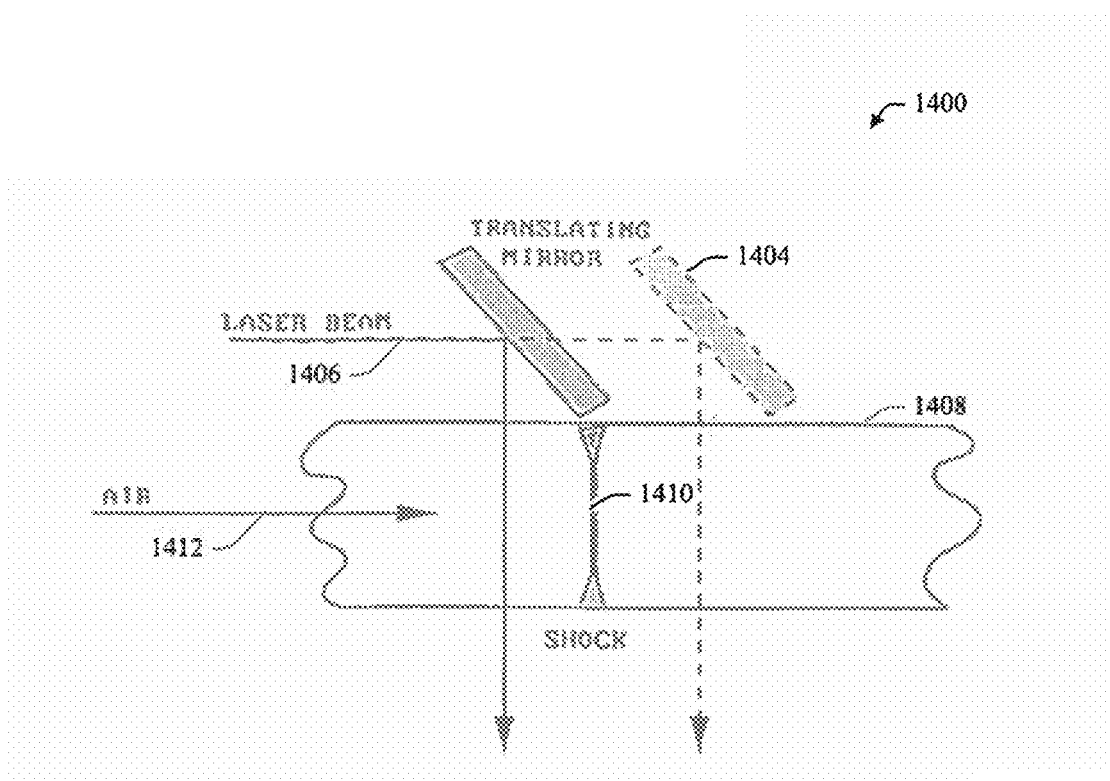
FIG. 14A illustrates an example system that provides for scanning an optical beam using translational electromechanical means.
Figure 14B:
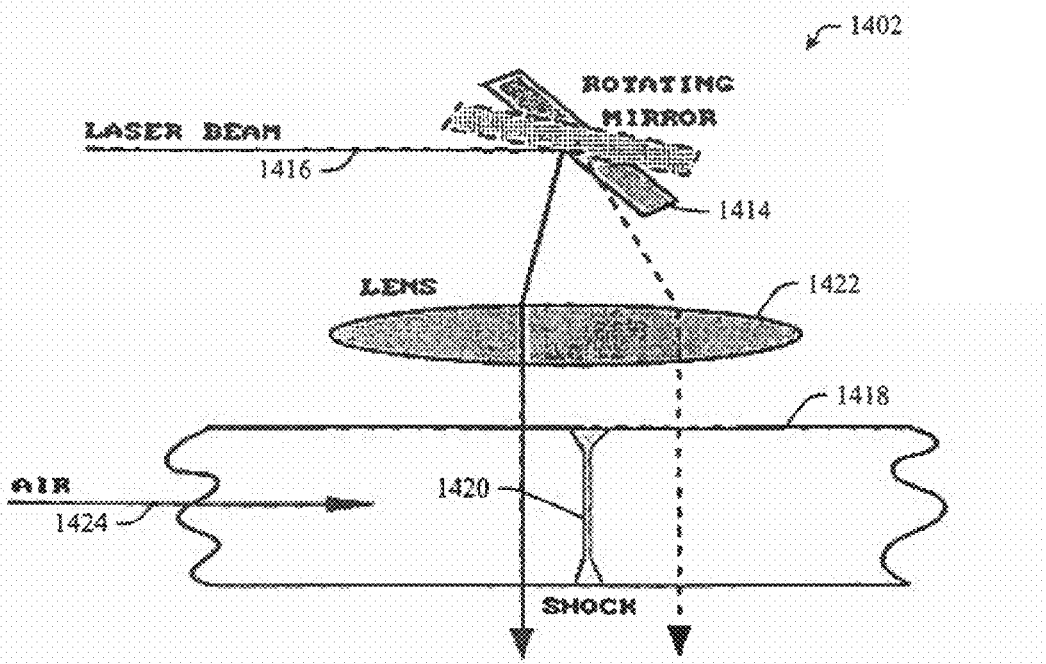
FIG. 14B illustrates a second example system that provides for scanning an optical beam using rotational electromechanical means.

FIGS. 14A and 14B illustrate two example systems 1400 and 1402 that provide for scanning an optical beam using electromechanical means. FIG. 14A illustrates an electromechanical scanning system 1400 that has a translating mirror 1404 that moves the incoming laser beam 1406 across a test section 1408 where shocks 1410 are expected. The laser beam 1406 can cross the test section 1408 at any nonzero angle (e.g., perpendicularly) to the direction of air flow 1412. Similarly, FIG. 14B illustrates an electromechanical scanning system 1402 that has a rotating mirror 1414 that moves the incoming laser beam 1416 across a test section 1418 where shocks 1420 are expected. Rotating mirror 1414 is incorporated such that its axis of rotation is placed at the reflecting surface of the mirror. A lens 1422 is also added and positioned in such a way that its focal point lies on the rotational axis of the mirror. Thus, the incident laser beam 1416, after reflection from the rotating mirror 1414, translates through the test section 1418 perpendicularly to the direction of the air flow 1424.

A consideration with electromechanical scanners such as those depicted in FIGS. 14A and 14B is that they require electrical power to operate mirrors. An alternative solution that does not have this consideration is to use a spectral scanner.

Figure 15:
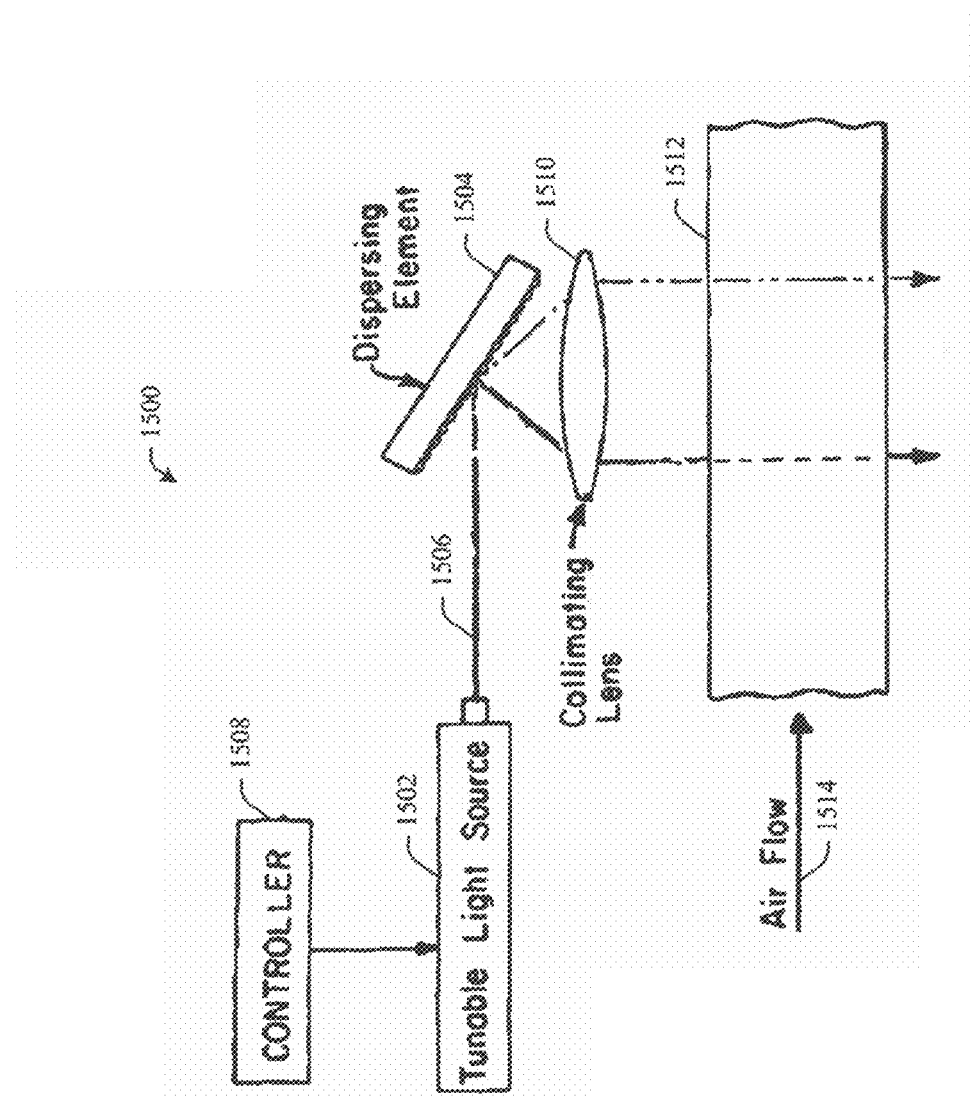
FIG. 15 illustrates a stationary scanning system that utilizes spectral scanning of an optical beam.

FIG. 15 illustrates a stationary spectral scanning system 1500 that utilizes spectral scanning of an optical beam. The spectral scanning system 1500 includes a tunable light source 1502 and an optical dispersing element 1504. Examples of dispersing elements are dispersive prisms and diffraction gratings. The tunable light source 1502 generates a narrow pencil beam of light 1506 whose optical frequency or wavelength changes in time in prescribed manner. A controller 1508 monitors the light emitted by the tunable light source 1502 and insures its timely emission at a prescribed sequence. After interaction with a stationary dispersive element 1504 the direction of the light beam changes depending on the optical frequency of the light. This space-frequency or space-wavelength scanning generates a "rainbow" with the difference that each "color" appears in its place at a given time.

In an aspect, a pencil laser beam containing several individual beams with different optical frequencies (wavelengths) may be used as the tunable light source 1502. Thus, the stationary dispersing element 1504 can produces several "rainbows." In the spectral scanner the optical dispersing element 1504 is positioned at the focal point of a collimating lens 1510. Similar to the systems illustrated in FIGS. 14A and 14B, after passing through the collimating lens 1510, the light then passes perpendicularly to the direction of the air flow 1512 through a test section 1514 where shocks (not shown) are expected.

Figure 16:
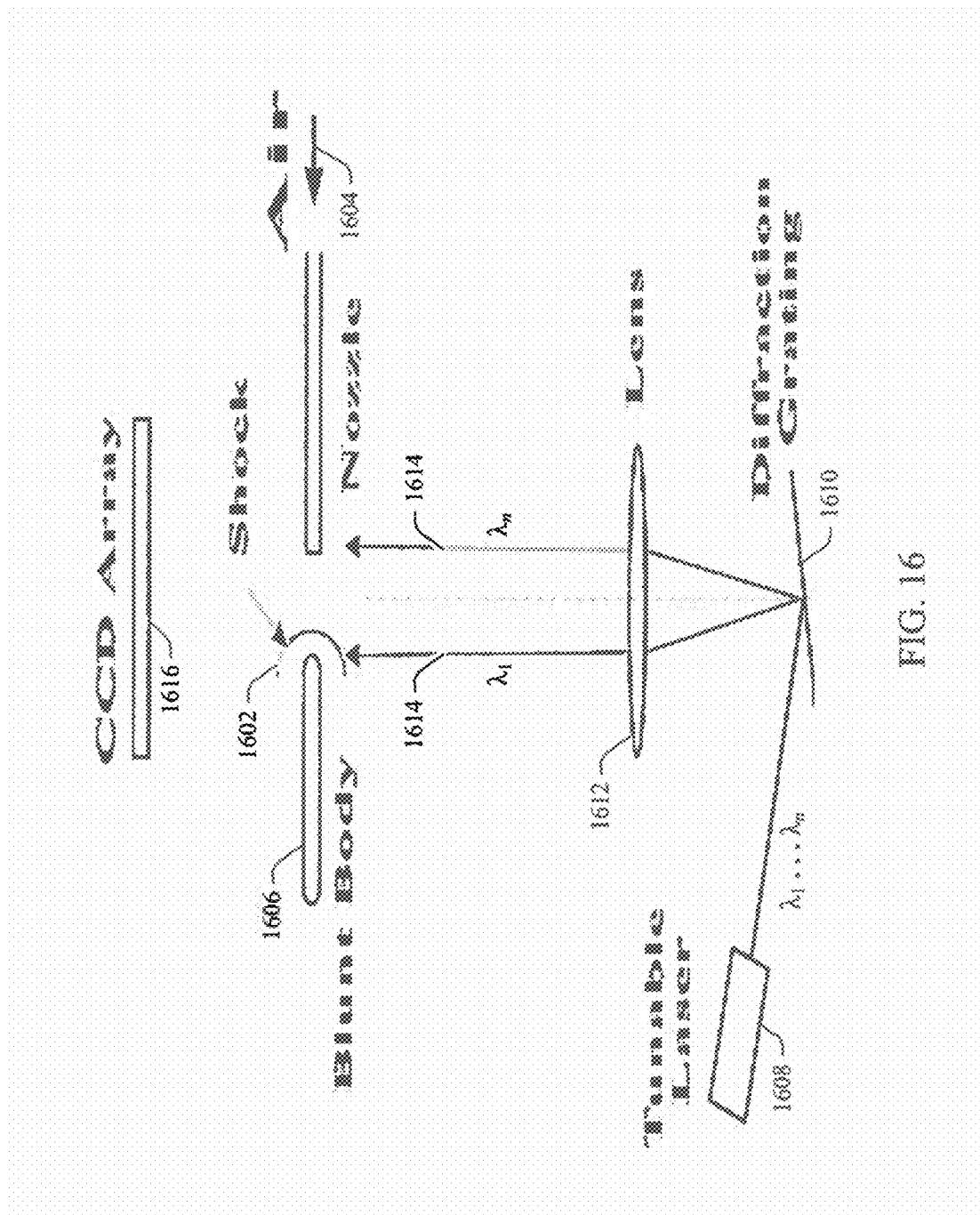
FIG. 16 illustrates an example schematic of a shock sensing system utilizing a spectral scanner.

FIG. 16 illustrates an example schematic of a shock sensing system 1600 utilizing a spectral scanner. A bow shock 1602 was generated by air 1604 impinging on a blunt body 1606. A tunable laser 1608, a diffraction grating 1610, and a collimating lens 1612 are assembled as explained in connection with FIG. 15 above such that beams 1614 exiting the lens 1612 remain parallel to each other and normal to the direction of the air flow 1604. A CCD array 1616 was used to obtain resulting pictures.

Figure 17:
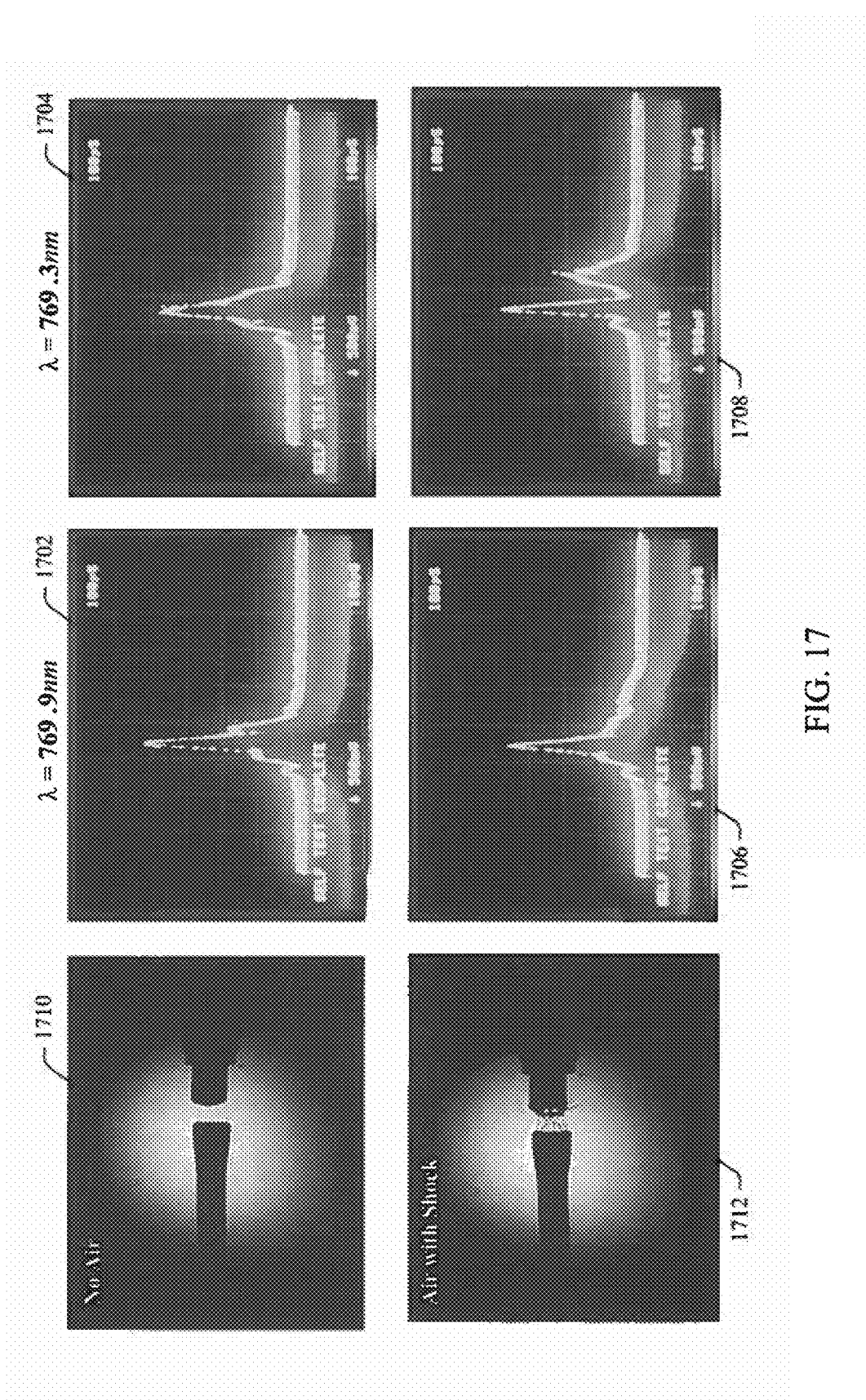
FIG. 17 illustrates results obtained from a shock sensing system utilizing a spectral scanner.

FIG. 17 illustrates results obtained from system 1600. The top row displays reference pictures of laser beam profiles 1702 and 1704 at wavelengths of 769.9 nm and 769.3 nm, respectively, without air sent through the system. The bottom row has the beam profiles 1706 and 1708 at the same wavelengths with the beam missing the shock at the 769.9 nm wavelength in beam profile 1706 and hitting the shock at the 769.3 nm wavelength in beam profile 1708. A CCD array was used to obtain the pictures. The left column contains shadowgraph images of the setup without the air flow 1710 and with a shock producing air flow 1712.

Shock detection using a scanning laser beam as described above may be based on scattering of the beam passing through aerodynamic shocks that have rapid changes in refractive index. As explained earlier, profiles of refractive index of aerodynamic shocks have been analyzed and in most cases approximated as an abrupt interface. As was mentioned above, experimental results as well as computational analyses have described the significant changes in the beam profile that result from those interactions. These changes manifest in the beam spreading and formation of tails and secondary fringes described above. The shock detection technique based on a scanning of a small diameter laser beam described above uses these changes in the laser beam profile as an indicator of the presence of shocks. The beam can be scanned using most any of the translational, rotational, or spectral scanning techniques described above. Changes in the beam structure can be detected and processed and the location of the aerodynamic shock can be determined based on the geometry of the installation. Detection methods may be better understood upon a review of the discussion that follows.

One potential application of such a scanning beam flow visualization technique is in-flight detection and monitoring of shocks including normal shocks generated in a mixed compression supersonic inlet. Thus, a shock sensor utilizing a scanning optical pencil beam is one potential replacement for conventional shadowgraph techniques.

However, one consideration arises from the fact that a key feature of the approach, scanning, is based on actually moving the beam across the area or aperture of interest. Thus, if the shock is not stable the technique may not able to detect it unless the beam, according to the Nyquist-Shannon sampling theorem, moves faster than the shock.

The scanning approach of the innovation in fact generates a sheet of light in a time-sequential manner. One approach that could mitigate considerations involving matching scanning rates of a rotation mirror and the frequency spectrum of the shock would be to make the light sheet time independent or time invariant. Some conventional Schlieren and shadowgraph approaches use powerful light sources and careful alignment of a combination of cylindrical lenses to generate sheets of light with a time invariant spatial intensity distribution. However, as discussed above, such conventional systems have multiple drawbacks, including space and weight requirements that make them unsuitable for certain uses, including in-flight uses on air- and space-borne vehicles.

Experimental Setup #2

Figure 18:
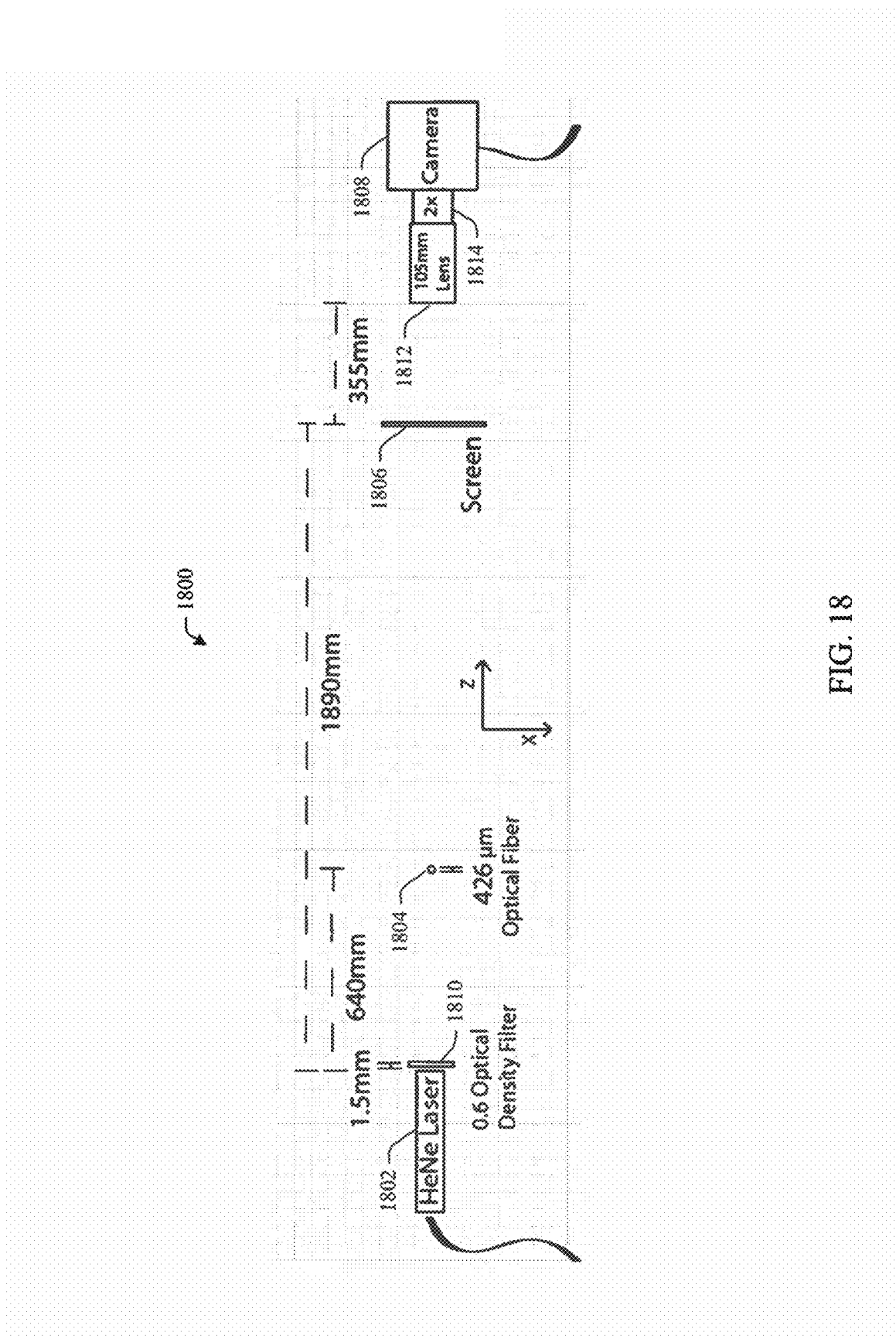
FIG. 18 illustrates an example schematic of an experimental setup used to study diffraction from an optical fiber.

Turning to FIG. 18, depicted is an example schematic of an experimental setup 1800 used to study diffraction from an optical fiber. The schematic gives a projection of the setup on the horizontal plane. The setup consisted of a 0.5 mW Helium Neon (HeNe) continuous wave (CW) laser 1802, vertically positioned optical fiber 1804, screen 1806, and camera 1808. In some embodiments, an optical density filter 1810 (e.g., a neutral density filter with 0.6 optical density) was also included. All major components were placed on a rail (not shown) that permitted change of the relative distance between them. The laser 1802 emitted a 0.48 mm diameter beam with Gaussian profile at 0.6328 μm wavelength. The optical fiber 1804 was a standard communication grade fiber with cladding diameter of 426 μm. It was placed on a translation stage (not shown) with a transverse computer-controlled actuator (not shown). Such an arrangement permitted changing the relative position of the fiber 1804 and the laser beam 1802 in a plane normal to the direction of the laser beam propagation. The diffraction pattern was projected onto a screen 1806, which was located 1250 mm away from the vertical fiber 1804. A 105 mm focal length lens 1812 and 2× teleconverter 1814 were used to image the screen 1806 onto the 1024×1024 CCD imaging array with 13 μm×13 μm pixels within camera 1808. Images were captured in tagged image file (TIF) format with 8-bit resolution.

Distances between major components of example setup 1800 are presented schematically in FIG. 18. The optical fiber and the screen were positioned at approximately 640 mm and 1890 mm from the laser respectively.

Several adjustments were made to optimize the beam imaging with the CCD camera 1808 so that the entire beam and extended scattering effects were captured. The image of the beam was made as large as possible to provide sufficient resolution for observing any changes in the diffraction pattern. The camera lens 1812 and teleconverter 1814 were adjusted to provide an imaged beam diameter that took up a significant portion of the captured image. Next, the intensity was reduced so that it did not saturate the sensors of camera 1808. This was accomplished by using a neutral density filter with optical density (OD)=0.6, decreasing the aperture of the camera, and reducing the exposure time.

Laser beam 1802 used in setup 1800 of FIG. 16 can be approximated as an ideal Gaussian beam with parameters dependent on the distance from the laser, as shown in equations 4 and 5 and the accompanying discussion:

$$Z_R = \frac{\pi \omega_0^2}{\lambda} \tag{4}$$

$$2\omega(z) = 2\omega_0 \left[1 + \left(\frac{z}{Z_R}\right)^2\right]^{\frac{1}{2}} = 2\omega_0 \left[1 + \left(\frac{\lambda z}{\pi \omega_0^2}\right)^2\right]^{\frac{1}{2}} \tag{5}$$

where:
 $2w_0$ is the diameter of the laser beam at the exit aperture,
 $\lambda$ is the wavelength of light,
 z is a variable distance from the laser exit aperture,
 $Z_R$ is the Rayleigh range, which is defined as the distance over which the beam radius spreads by a factor of $\sqrt{2}$, and
 $2\omega(z)$ is the diameter.

Using equations 4 and 5 above and properties of the laser 1802, parameter values can be calculated using setup 1800 illustrated in FIG. 16. The calculated Rayleigh range was approximately 286 mm. Calculated from equations 4 and 5, the diameter of the incident Gaussian beam at the location of optical fiber 1804 and on screen 1806 was approximately 1.18 mm and 3.21 mm respectively. Adjustments to the magnification of camera 1808 were selected to generate two different types of the imaged diffraction pattern.

Figure 19:
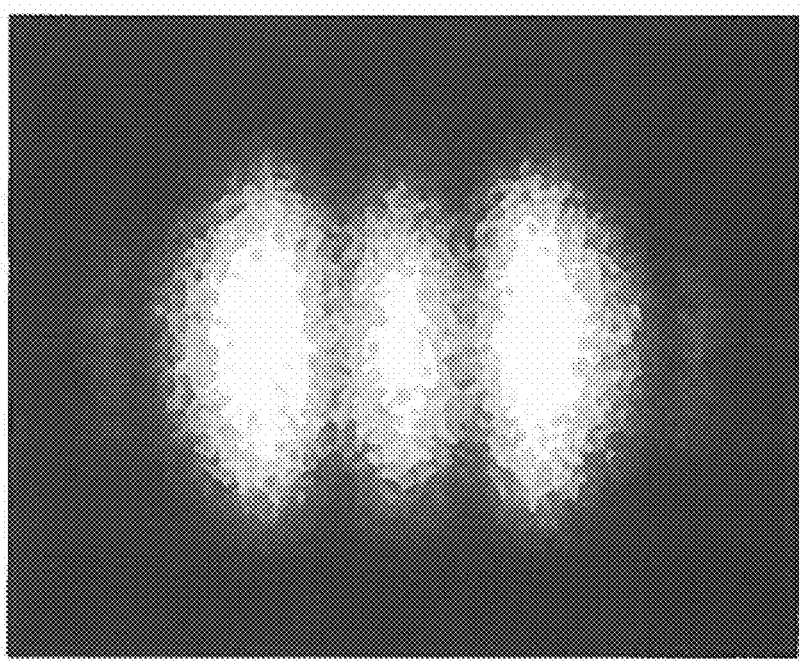
FIG. 19 illustrates an image projected on a screen of a portion of a pattern generated by an incident laser beam passing near the center of an optical fiber.

FIG. 19 shows an image of a portion of the pattern near the center of the incident beam. This type of the imaged pattern was produced with teleconverter 1814 attached to camera 1808 as shown in FIG. 16. Teleconverter 1814 restricted the field of view. Such arrangement led to a narrow field of view and the resultant image in FIG. 19.

Figure 20:
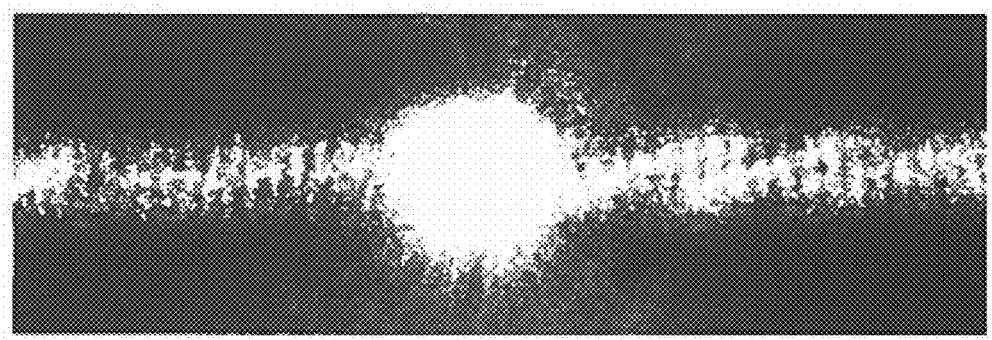
FIG. 20 illustrates an image projected on a screen of a wider portion of a pattern generated by an incident laser beam passing through the center of an optical fiber located farther away from the laser.

FIG. 20 shows an image of a diffraction pattern obtained by the wide view. In the example, this type of imaged pattern was generated when teleconverter 1814 was removed. That led to a wider portion of the pattern on screen 1806 to become viewable by camera 1808. The wide field of view, also called a wide angle case, allowed camera 1808 to capture the diffraction pattern not just at the center around the incident beam but also well beyond its boundaries. The wide field of view captured a much larger area on screen than the narrow view, which led to a greater magnification of the area observed. In the experiment of setup 1800 the area of observation was increased by a factor of 25. In obtaining FIG. 20 the optical fiber was positioned farther away from the laser than in FIG. 19, which accounts for the different diffraction patterns.

Inspection of a Gaussian beam diffracted by optical fiber 1804 was done by replacing screen 1806 in FIG. 18 with a beam analyzer (not shown), a CCD based camera directly exposed to the image forming optical beam.

Figure 21:
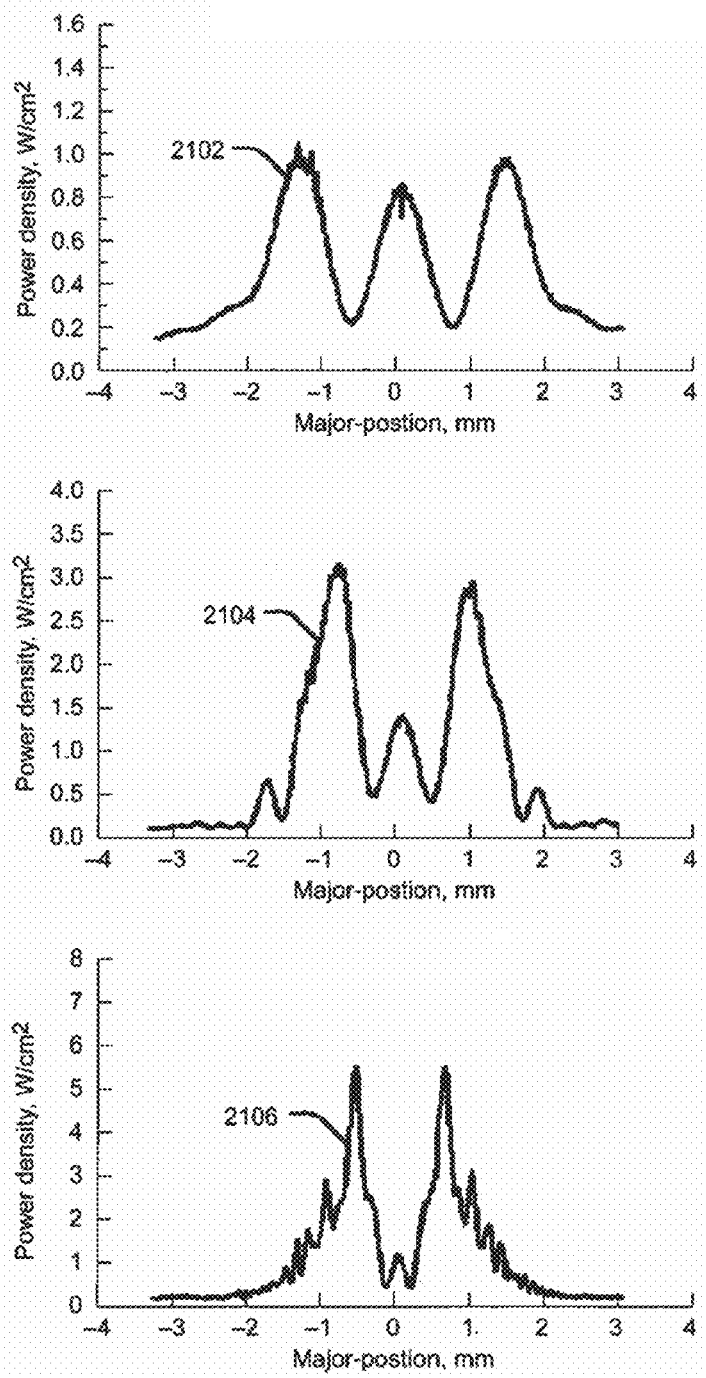
FIG. 21 illustrates intensity profiles of diffraction patterns observed at multiple distances from a laser.

FIG. 21 depicts intensity profiles of diffraction patterns observed by a directly exposed beam analyzer located at a distance 1.5 m from laser 1802, showing intensity profile 2102 of the laser beam diffracted by optical fiber 1804 positioned at an approximate distance of 0.25 m from laser 1802, intensity profile 2104 corresponding to an approximate distance of 0.75 m, and intensity profile 2106 corresponding to an approximate distance of 1.25 m. The beam analyzer was located at a fixed position of approximately 1.5 m from laser 1802. As shown in intensity profile 2102, movement of fiber 1804 from the location shown in FIG. 18 to a position closer to laser 1802 resulted in a diffraction pattern with distinct dark and bright lobes moving farther and farther from the laser spot center. This was accompanied by decrease in the intensity of the diffraction pattern and an increase in the lobe separation. Movement of the fiber from the original location farther away from the laser resulted in a smaller portion of the incident light passing through the fiber, as shown in intensity profiles 2104 and 2106. The result in intensity profile 2106 includes formation of an image of fiber 1804 similar to that observed by using a shadowgraph.

Figure 22:
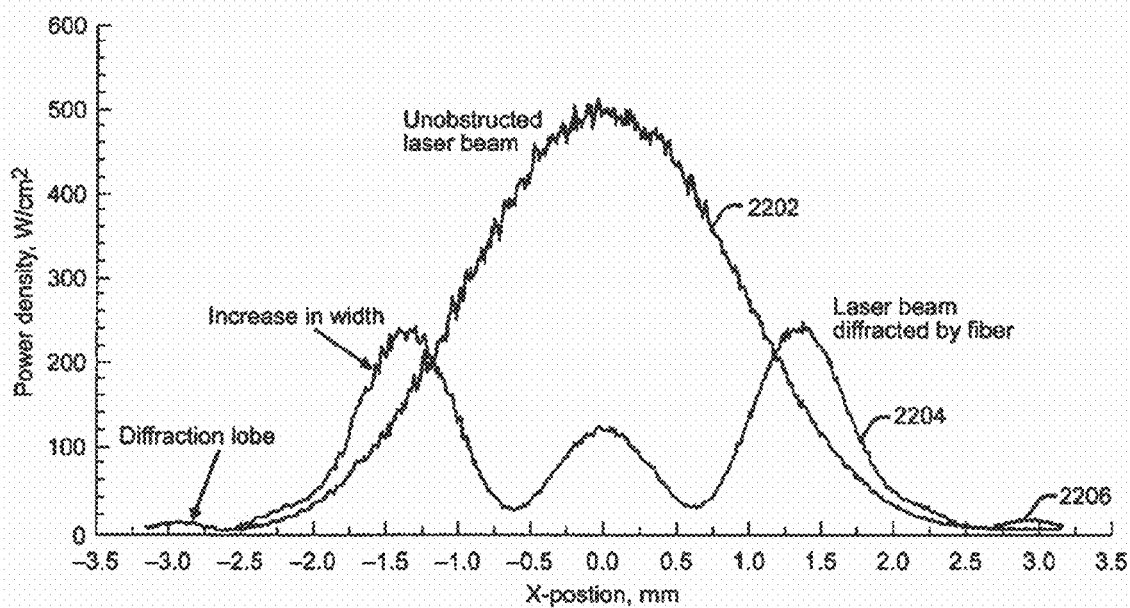
FIG. 22 illustrates power density measurements comparing a profile of an unobstructed laser beam with a profile of the laser beam diffracted by a fiber placed at the center of the laser beam path.

Returning to the discussion of experimental setup 1800, FIG. 22 illustrates power density measurements comparing profile 2202 of the unobstructed laser beam with profile 2204 of the laser beam diffracted by fiber 1804 placed at the center of the laser beam path. The beam analyzer in this case was located in place of screen 1806. The neutral density filter 1810 discussed above was removed to obtain profile 2202 and 2204.

FIG. 22 demonstrates that profile 2204 corresponding to the diffracted laser beam increases in width when compared to profile 2202 of the unobstructed laser beam. Integration of areas under the curves of profiles 2202 and 2204 shows an approximate 50% decrease in intensity in the diffracted pattern of profile 2204 as compared to the intensity of the unobstructed beam in profile 2202. The intensity losses can be attributed primarily to the wide angle scattering, and to back reflection and absorption. The redistribution of light intensity due to the wide angle scattering is shown by the presence of diffraction lobes such as diffraction lobe 2206. Diffraction lobes such as lobe 2206 are visibly evident beyond the observed range shown in FIG. 22 and can be seen in FIG. 20.

As used herein, 'core beam' refers to the central portion of the observed laser beam pattern. The core beam is where the majority of the power of the laser beam is located. The core beam spread can be investigated with the narrow view discussed above. Outside of the core beam, diffraction from the optical fiber reveals many secondary diffraction lobes of much lower intensity. The wide angle diffraction can be investigated with the wide view mentioned earlier.

In one or more embodiments, the innovation includes use of image processing techniques discussed herein to accurately detect and localize a shock using the diffraction signature described above. Two image processing techniques have been developed, the Consecutive Pixel Counting (CPC) technique and the Summing Pixel Counting (SPC) technique. These techniques may be used to detect the spreading of the laser as it passes through an inhomogeneity such as an optical fiber or shock. The CPC technique utilizes the narrow view, while the SPC technique utilizes the wide view. Following is a discussion of each of these techniques.

Consecutive Pixel Counting (CPC) Technique

The CPC technique can be used to obtain a quantitative value that estimates the width of the spread in terms of consecutive bright pixels. First, an intensity threshold value can be selected between the dark minimum and bright maximum range of intensities of the camera. This threshold determines what intensity is bright enough to be considered part of the beam spread. The image may then be scanned horizontally one row at a time. Using the intensity threshold value, the number of consecutive bright pixels can be counted and the maximum number and location of the center can be returned. This maximum number is a value that can be compared to the value of a reference image where no diffraction takes place.

Figure 23:
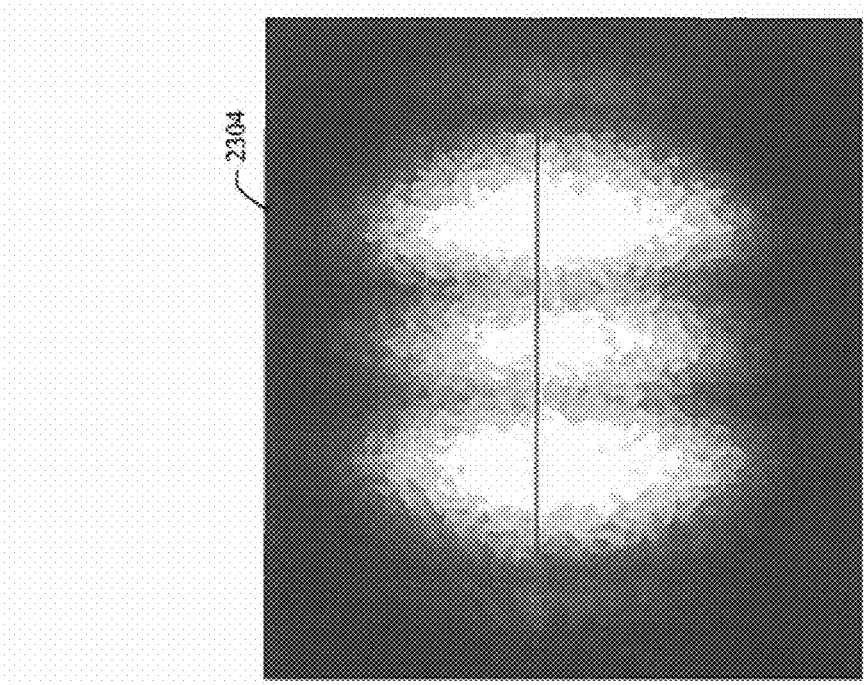
FIG. 23 illustrates the results of Consecutive Pixel Counting (CPC) testing that contrast an image of a reference unobstructed beam to an image of a beam passing through the center of a simulated shock.
Figure 23:
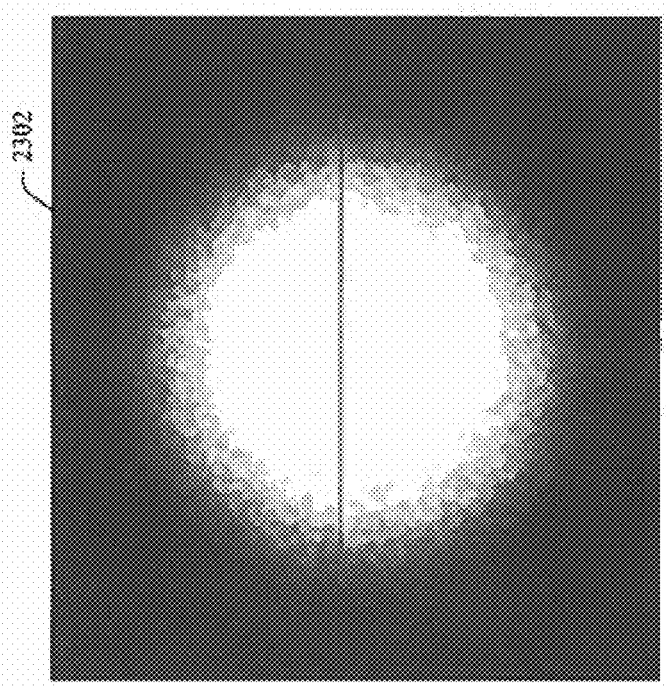

Turning to FIG. 23, depicted are images showing the results of CPC testing that contrast an image 2302 of a reference unobstructed beam to an image 2304 of a beam passing through the center of the simulated shock. For a sample intensity threshold value, the maximum consecutive beam spread in images 2302 and 2304 as shown with the horizontal line are 525 and 657 pixels respectively. Because the images have a resolution of 9.7 µm per pixel, these values correspond to beam spreads of 5.09 mm for the unobstructed beam and 6.37 mm for the obstructed beam. The unobstructed beam diameter is significantly different from the calculated Gaussian beam diameter of 3.21 mm from equations 4 and 5 above. This difference can be attributed to screen diffusion, camera saturation effects, and the use of an intensity threshold value that was selected primarily for measuring diffraction changes rather than the diameter.

During image processing by a processor employing the CPC technique, a complication arises from the presence of the dark spots between the bright lobes in image 2302 of diffraction by a simulated shock, as compared with image 2304 of an unobstructed beam. One solution is to use a lower intensity threshold that can ignore the darker areas. Another solution includes pre-processing the image with a weighted average blur (e.g., with a 3 pixel Gaussian blur), which helps combine the bright lobes together. A weighted average blur can be used to add low-frequency detail and can produce a hazy effect masking over the darker pixels with brighter pixels. This has the effect of making brighter pixels darker as well, but because much of the bright areas are already saturated, averaging with darker pixels along with the lower threshold value results in a successful detection of consecutive bright pixels.

During image acquisition, a blooming effect can occur, causing some of the pixels directly above and below the beam to become bright as well. This bleeding effect can occur when the camera is exposed to a too high light intensity. Nonetheless, these saturation effects do not influence the results because the CPC and SPC techniques scan in the horizontal direction and blooming occurs in the vertical direction. However, if different hardware or camera orientation resulted in a blooming in the scan range, then the resulting increase in intensity would influence the results.

Figure 24:
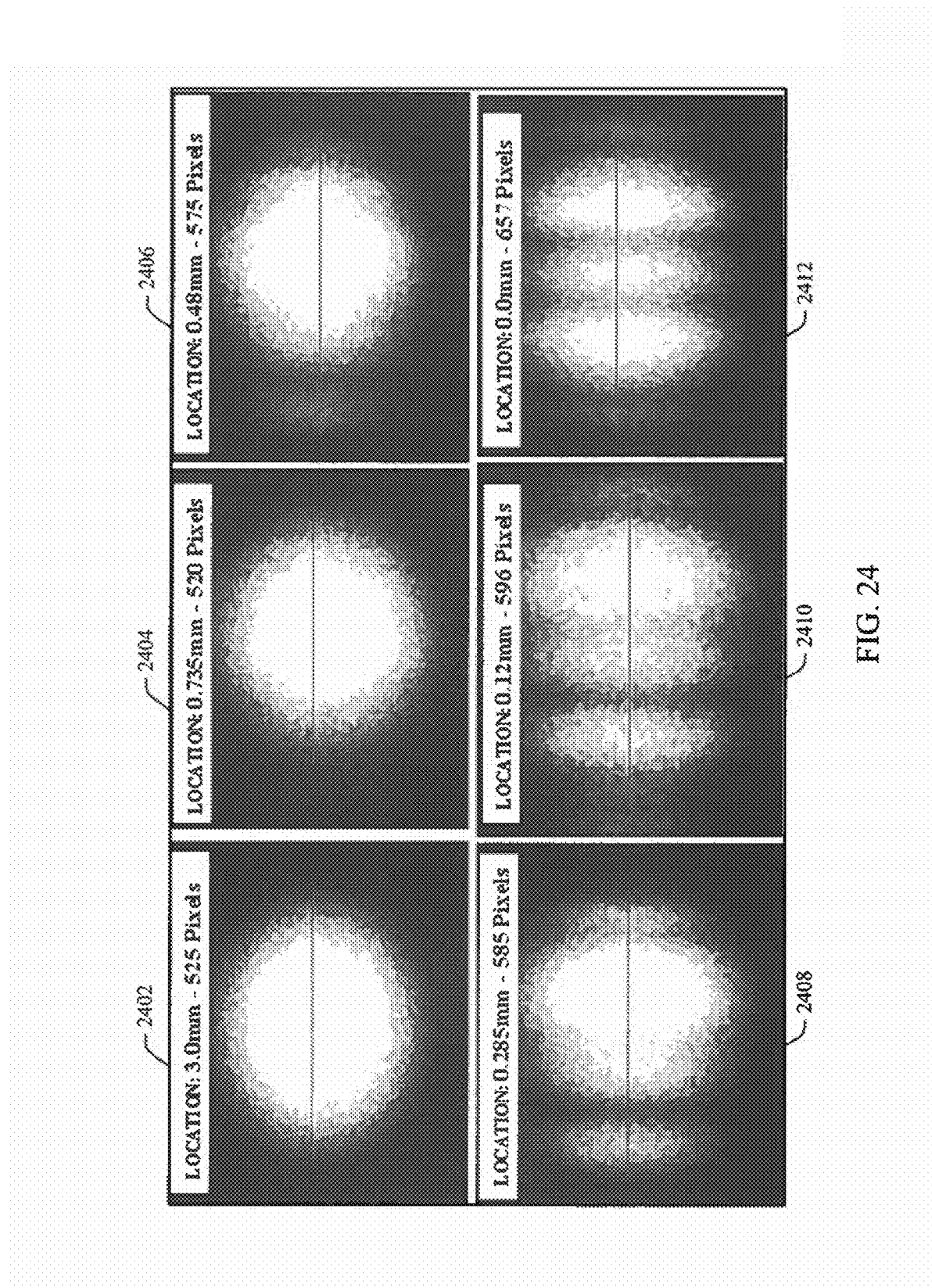
FIG. 24 illustrates images obtained from testing involving application of the CPC technique to a simulated shock.

Referring now to FIG. 24, depicted are six images obtained from testing involving application of the CPC technique to a simulated shock. The horizontal line, determined by the CPC technique, represents the largest number of consecutive pixels above a given intensity threshold. The results were obtained using experimental setup 1800 of FIG. 18. A sequence of images, including images 2402-2412, was captured to inspect how the simulated shock interacted with the laser beam. The simulated shock positioning began outside the laser beam path, and was then moved perpendicularly into the laser beam in 15 µm increments along the X axis depicted in FIG. 18. This movement increment was chosen because it is equivalent to the 15 µm guaranteed on-axis accuracy of the actuator used in experimental setup 1800. An image was captured after each movement of the simulated shock. The testing continued until the simulated shock passed completely through the laser beam. The setup used an optical density filter to reduce the intensity of the beam and an exposure time of 60 ms for camera 1808.

Figure 25:
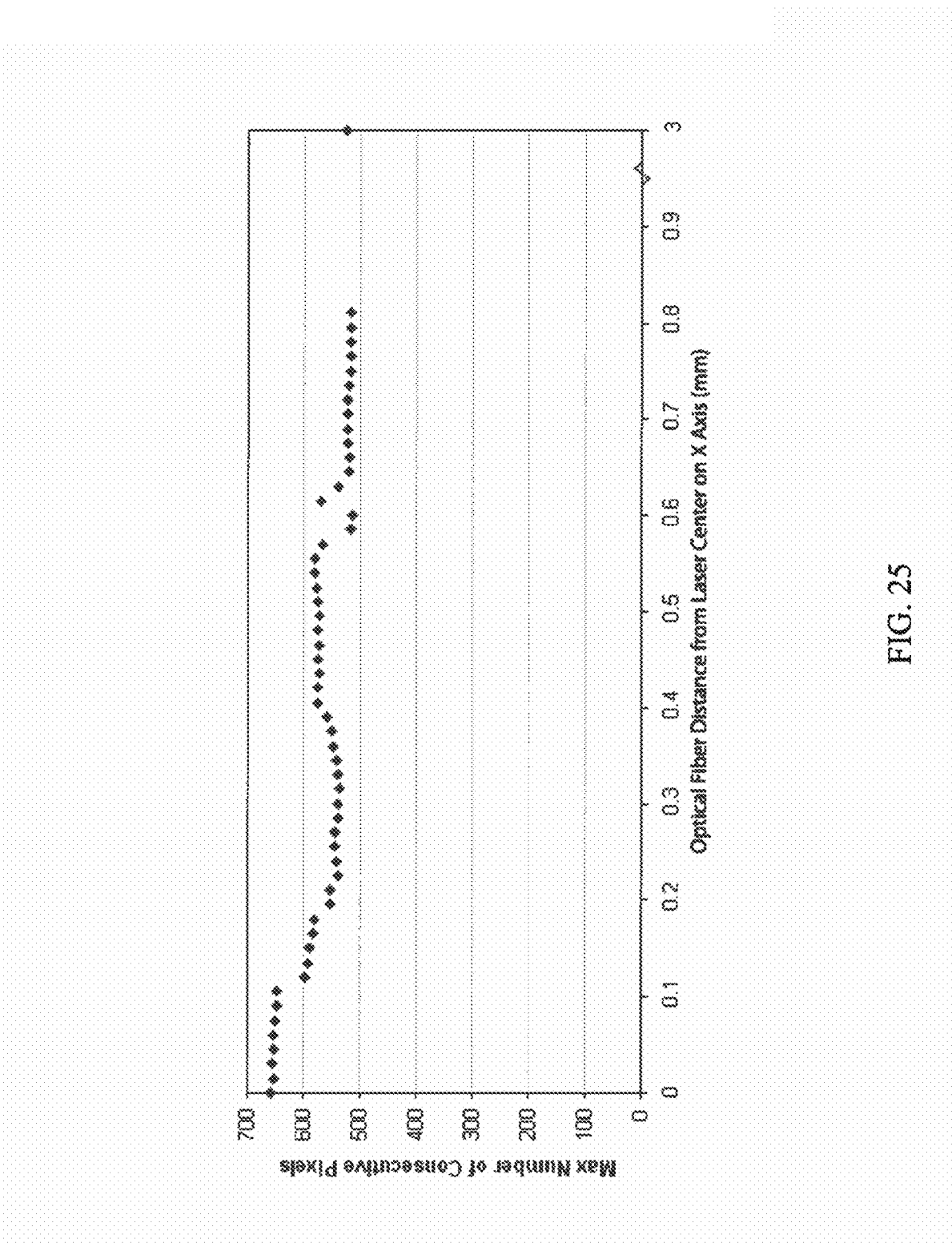
FIG. 25 illustrates a graph of results obtained from applying the CPC technique to a sequence of images.

Illustrated in FIG. 25 is a graph of results obtained from applying the CPC technique to a sequence of images of which a sample is shown in FIG. 24. The maximum number of consecutive bright pixels determined by the CPC technique was plotted against the distance from the simulated shock. The zero on the distance scale was determined both visually and by the horizontal symmetry of the diffraction pattern as seen in images 2304 and 2412.

Only data points up to the center of the laser beam path are displayed in FIG. 25 because the results are symmetrical around the 0 mm point. As the simulated shock displacement is increased beyond 0.8 mm, the approximate spread in the laser beam pattern remains at 525 pixels. This is as expected because the simulated shock will no longer affect the beam when the simulated shock is outside the beam's path.

Returning to FIG. 24, six images 2402-2412 are shown that illustrate the change in the diffraction pattern as the simulated shock enters the laser beam from the left side of the image. Image 2402 is the unobstructed reference beam and image 2412 is the fully obstructed beam. The horizontal line indicates the location of the maximum consecutive bright pixels with the intensity threshold sensitivity set at 50. The text displayed in each of images 2402-2412 shows the approximate location in mm of the simulated shock from the center of the laser beam as well as the length of the horizontal line in pixels.

Complications of the CPC technique shortcomings can be seen from the results. Specifically the influence of disconnected bright lobes can result in inconsistent consecutive bright pixels. The narrow field of view visualizes the detail of beam diffraction specifically near the center. This allows one to see where the dark spots disrupt the CPC technique. This influence can be ameliorated using techniques described above, such as using a lower intensity threshold or pre-processing the image with a weighted average blur.

Summing Pixel Counting (SPC) Technique

In some embodiments, to avoid the complications of the CPC technique, the Summing Pixel Counting (SPC) technique can be used. The SPC technique emphasizes using all diffraction spreading such as that visualized through the wide camera view. Much like the CPC technique, the SPC technique can count bright pixels that have an intensity value greater than or equal to a chosen intensity threshold, but where the SPC technique differs is that the bright pixels do not have to be consecutive. Instead, all the bright pixels can be counted for each row and the maximum number and location can be returned.

Figure 26:
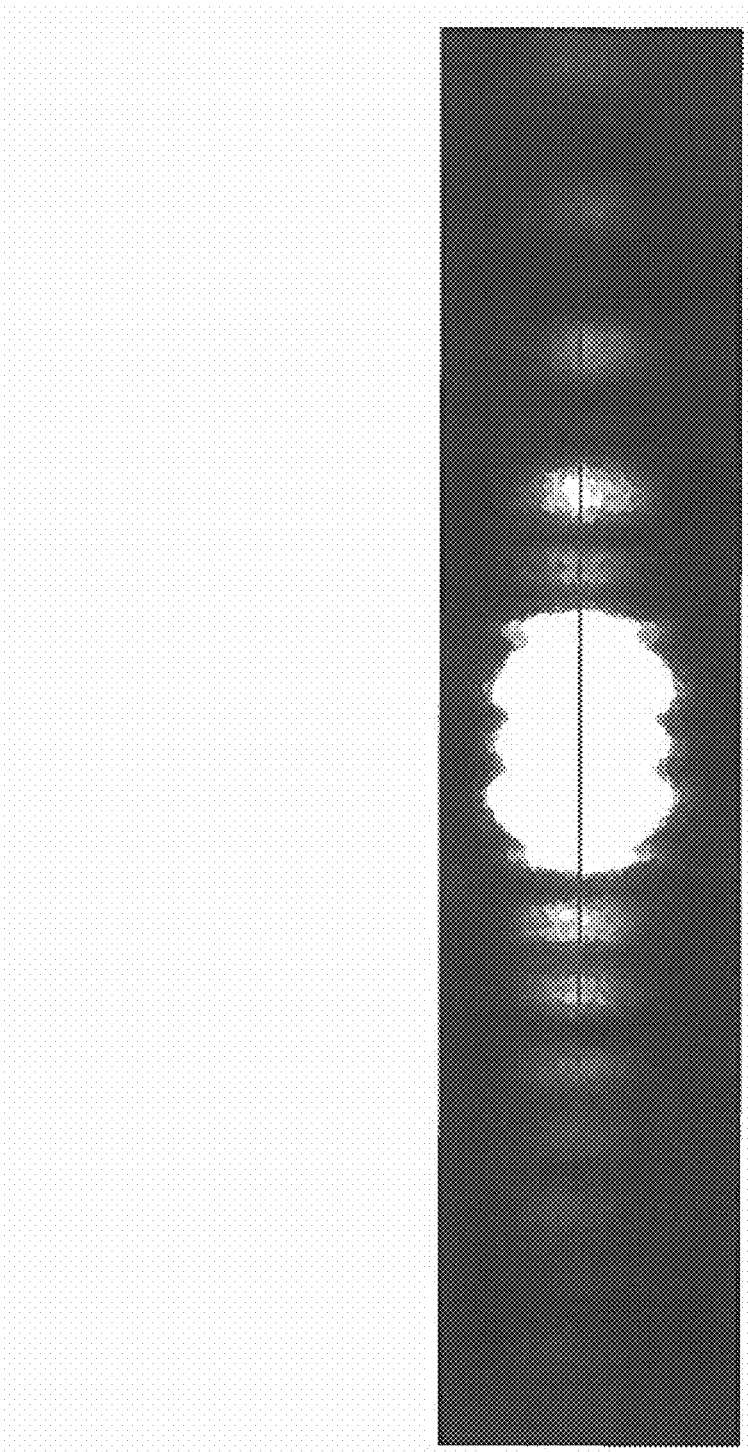
FIG. 26 illustrates an image of initial Summing Pixel Counting (SPC) testing of a beam passing through the center of a simulated shock.

Turning to FIG. 26, shown is an image of initial SPC testing of a beam passing through the center of the simulated shock. The intermittent horizontal line, determined by the SPC technique, represents the largest number of pixels on a specific image line above a given intensity threshold. The intensity threshold selected for this example image was selected to be 48 in order to focus on detection of the bright diffraction lobes in the central area of the image, whereas the dimmer lobes were mostly ignored. Reducing the threshold value would increase the sensitivity of the SPC technique to detect a larger portion of the diffracted light. As seen in FIG. 26, intermittent dark areas have no effect on the bright pixel counting of the SPC technique, which avoids the complications of the CPC technique discussed above.

The testing for the SPC technique used setup 1800 with a few minor adjustments. Just as in the testing of the CPC technique discussed above, the simulated shock was moved through the laser beam perpendicularly along the X axis of FIG. 18, except that the incremental movement was increased to 50 µm for the SPC testing. The larger increment still provided acceptable results while reducing the time of the experiment. However, a different increment size than 15 µm or 50 µm could be used in the CPC technique, the SPC technique, or both. Teleconverter 1814 was removed from the setup so that a larger field of view was exposed to camera 1808. Due to lab constraints, camera 1808 and screen 1806 were moved 360 mm closer to the laser source. The resulting captured images have a resolution of 47.6 µm per pixel. To increase the intensity of the diffraction pattern, the laser beam power was increased by removing the neutral density filter 1810. This resulted in saturation of the image at the center. In order to create an image despite the saturation, an accumulation technique was employed wherein multiple exposures were taken for each image.

Figure 27:
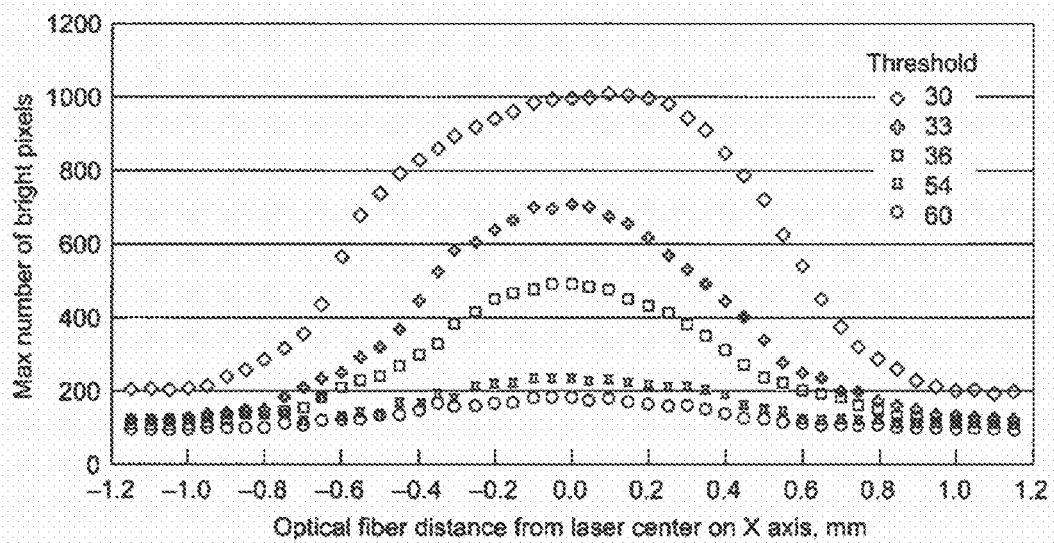
FIG. 27 illustrates graphs of results from processing a sequence of images with a simulated shock passing through a laser beam using the SPC technique.

FIG. 27 displays graphs of results from processing a sequence of images with the simulated shock passing through the laser beam using the SPC technique. The maximum number of bright pixels was calculated by the SPC technique. The distance was the location of the simulated shock in mm with respect to where the center of the beam passes through the center of the simulated shock. Distance 0 mm was determined visually as well as by the horizontal symmetry of the diffraction pattern as seen in FIG. 26. While FIG. 26 used an intensity threshold of only 48, seven different intensity thresholds are plotted to demonstrate the sensitivity of the SPC technique in FIG. 27.

The results depicted in FIG. 27 are of scans with various intensity thresholds ranging from 30 to 60. Testing with this setup with thresholds below 30 began to show erroneous results because a lower threshold fell into the noise range for this setup, thus counting pixels as bright that would normally be considered dark. Thresholds above 60 began to result in erroneous results because this threshold is beyond the intensity range of the diffracted light, thus ignoring pixels normally considered bright. Although the range of intensity thresholds from 30 to 60 was used in this experimental setup, a different range of intensity thresholds may be appropriate for other setups in experiments or applications, as would be better understood by a person skilled in the art in light of the discussion herein. The maximum number of bright pixels levels off beyond the simulated shock location range shown in the graph above because the simulated shock no longer affected the beam when the simulated shock was outside the beam's path.

Figure 28:
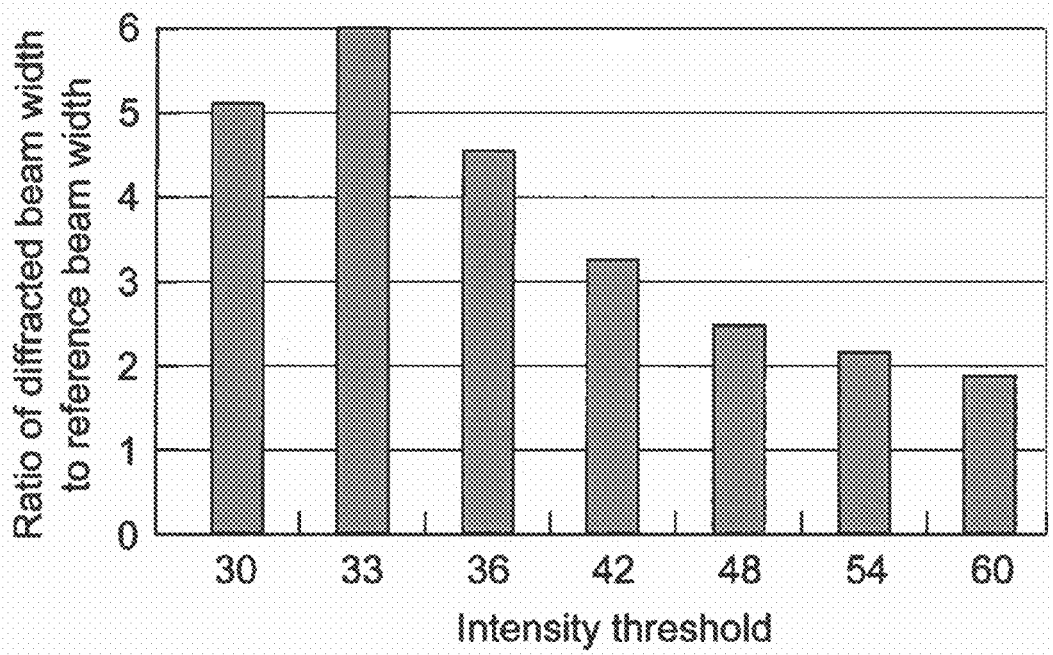
FIG. 28 illustrates a comparison of the different intensity thresholds used to obtain the results of FIG. 27.

FIG. 28 shows a comparison of the different intensity thresholds used to obtain the results of FIG. 27. The results from FIG. 27 were used to find a favorable intensity threshold by taking the maximum value and dividing by the minimum value for each threshold. In other words, this is the ratio of the diffracted beam width over the reference beam width. FIG. 26 shows a peak ratio at an intensity threshold of 33. This intensity threshold was the optimum choice in the experiment for determining the positioning of the simulated shock when comparing the diffracted beam to the reference beam. Although the optimum intensity threshold was 33 based on this experimental setup, a different intensity threshold may be optimal for other setups used in experiments or applications, as can be better understood by a person skilled in the art in light of the discussion herein.

Near and Far Field Comparison of the CPC and SPC Techniques

Figure 29:
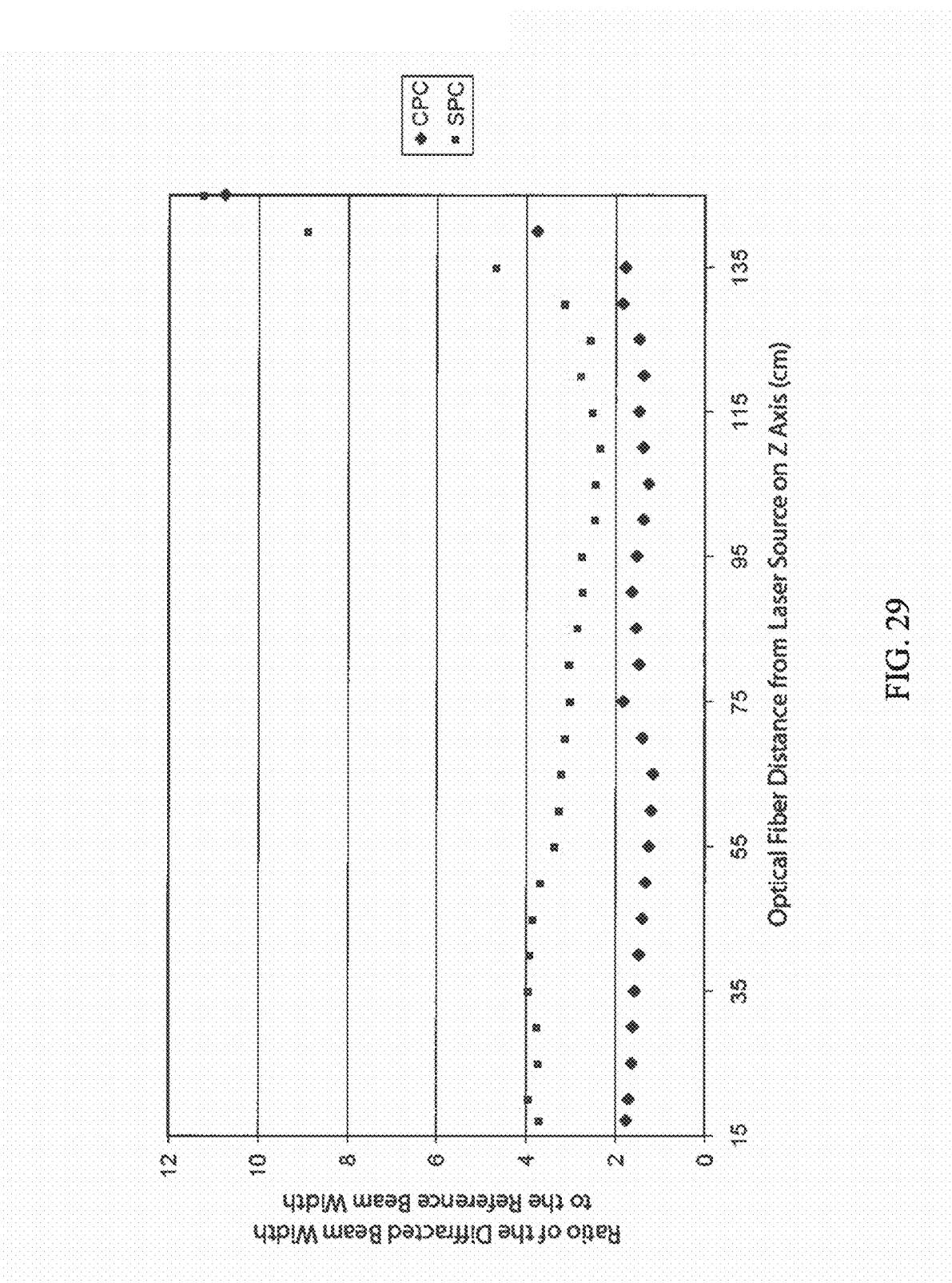
FIG. 29 illustrates results of tests comparing the CPC and SPC techniques at different distances using an intensity threshold of 100.

FIG. 29 shows results of tests comparing the CPC and SPC techniques at different distances using an intensity threshold of 100. A comparison of near and far field effects was observed by moving the simulated shock different distances from laser 1802 along the Z axis of setup 1800 shown in FIG. 18 while still remaining in the center of the laser beam. Optical fiber 1804 or a simulated shock was positioned at 17 cm away from laser 1802, then was moved to 20 cm, then was incremented by 5 cm until it reached the final position of 145 cm. The 17 cm and 145 cm limits were the two distance extremes that were possible without making contact with the other equipment of setup 1800. At each increment, the resulting diffraction pattern was captured and analyzed with the CPC and SPC techniques using an intensity threshold of 100.

The near and far field effects were inspected to ensure the reliability of the pencil beam shock sensing technique even when there were concerns of Rayleigh range influence. The Rayleigh range is the short distance after light exits the laser where the light is best modeled as a planar wave. After passing the Rayleigh range, the light is then best modeled as a spherical wave. The Rayleigh range of setup 1800 was approximately 28.6 cm. Examination of the results illustrated in FIG. 29 show a ratio greater than 1 across the entire range, which demonstrates that the CPC and SPC techniques can effectively localize the simulated shock based on the diffraction of the laser beam regardless of the distance of the simulated shock from the laser. It is also to be appreciated from FIG. 29 that the SPC technique had a ratio that was greater than the CPC technique across the entire range of distance increments, thus implying that the SPC technique is an improvement to the CPC technique. The drastic increase in the calculated ratio from both the CPC and SPC techniques in the last four data points of FIG. 29 was most likely caused by the simulated shock approaching the screen. While such an effect might seem inconsistent with the rest of the results, the fact that the ratio was greater than 1 still implies that the CPC and SPC techniques can be used to localize the simulated shock.

Figure 30:
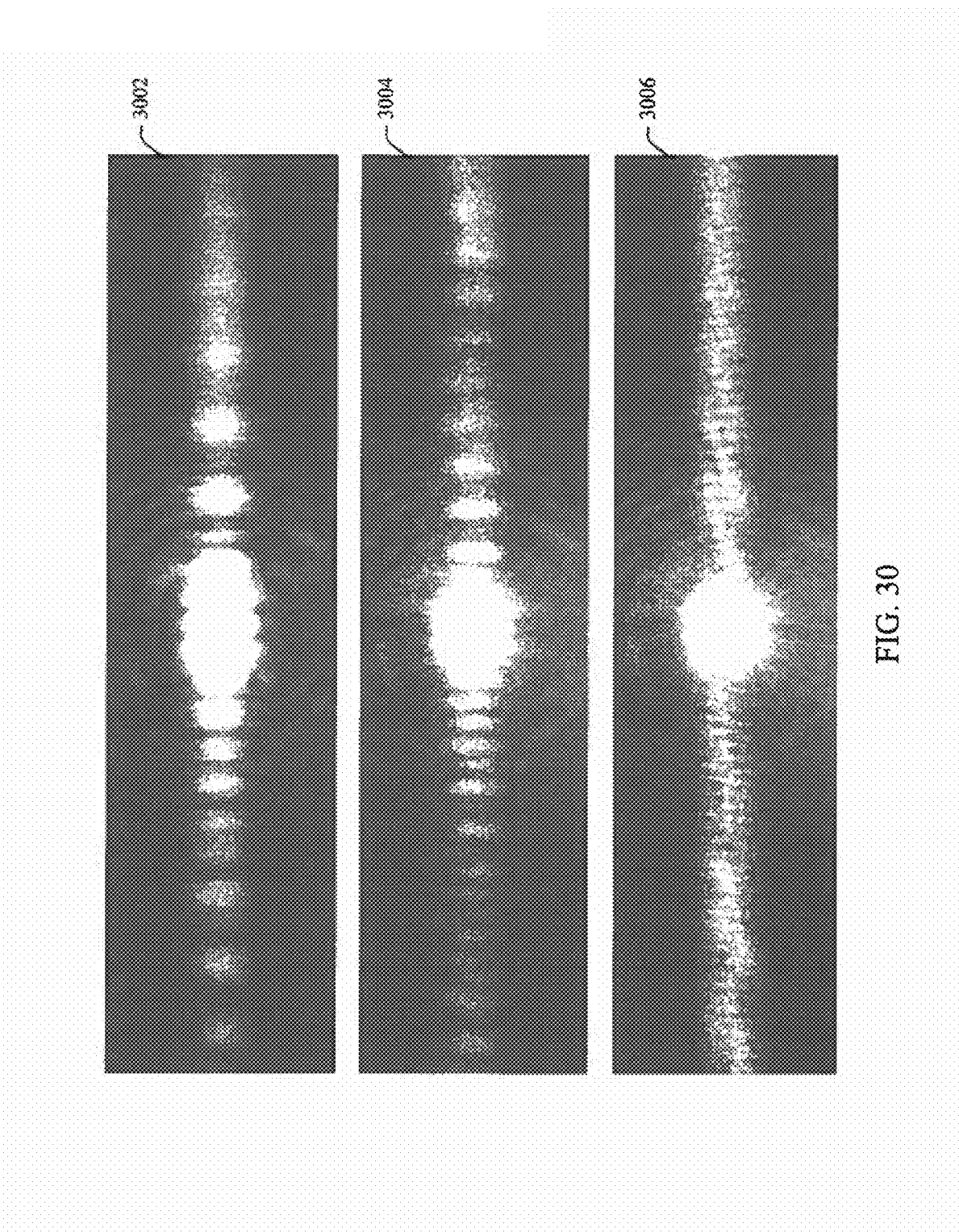
FIG. 30 illustrates that the diffraction pattern morphology differs with respect to the distance an optical fiber or a simulated or actual shock is from a laser.

FIG. 30 demonstrates that the diffraction pattern morphology differs with respect to the distance optical fiber 1804 or a simulated or actual shock is from laser 1802, as seen in FIG. 18. Diffraction pattern 3002, captured when optical fiber 1804 was close to laser 1802 (at an approximate distance of 30 cm) has large distinct bright lobes, each with a larger width than those in patterns 3004 where optical fiber 1804 is farther away from laser 1802 (corresponding to an approximate distances of 80 cm). Moving optical fiber 1804 away from laser 1802 resulted in the individual lobes moving towards the center of the laser beam, as if the diffraction pattern is squeezing itself together. The end result at 145 cm (not shown), which was the furthest from laser 1802 that optical fiber 1804 could be placed in setup 1800, is a blurred diffraction pattern; similar to diffraction pattern 3006 (corresponding to an approximate distance of 130 cm), without the existence of separate distinguishable lobes as seen in patterns 3002 and 3004.

As an example application, diffraction patterns such as patterns 3002, 3004, and 3006 can be used to evaluate the diffraction pattern around the core beam to calculate the distance an inhomogeneity such as a simulated or actual shock is from a laser source when the laser source is a fixed distance from a screen, camera, or other detector.

Referring again to FIGS. 25 and 26, visualization of the diffraction pattern on a screen can be described as the circular shape of the laser beam being distorted into several oval shaped lobes with different sizes and intensities. These lobes shift and recombine with each other as the optical fiber or simulated shock is moved across the laser beam, as shown in FIG. 24 at 2402 through 2412. The shifting and recombining of the lobes in the narrow view inspected in the CPC technique result in the laser beam spread width not being a monotonic function of the simulated shock movement. Specifically within the simulated shock displacement range of approximately 0.3 mm to 0.6 mm in FIG. 25, the laser beam spread width increases as the simulated shock was moved through this region.

Figure 31:
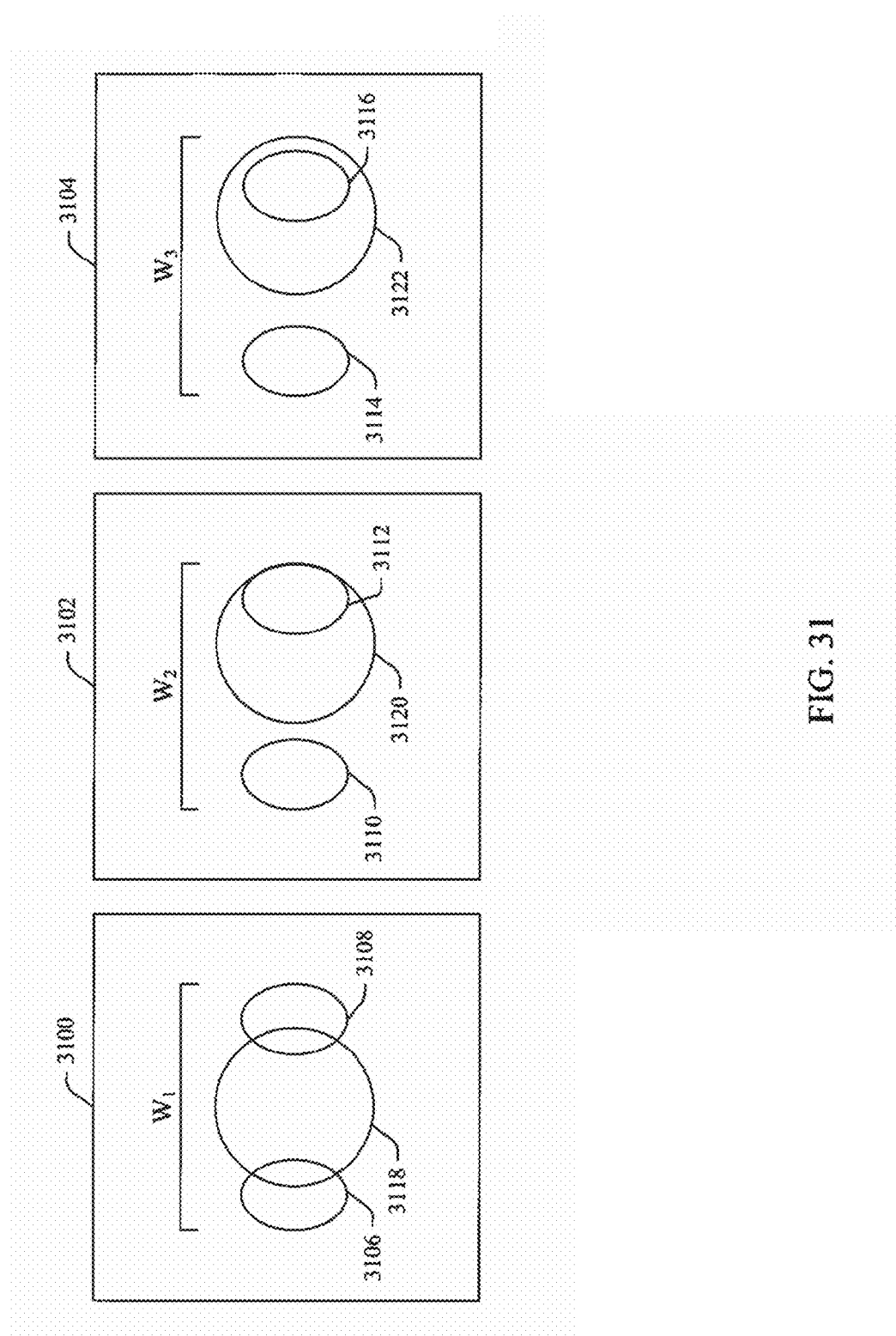
FIG. 31 illustrates a reason for an increase in laser beam spread width as a simulated shock moves through a region.

FIG. 31 illustrates a reason for the increase in laser beam spread width as the simulated shock moved through this region. A reason for the increase of spread width was because of the shift, seen across representations 3100, 3102 and 3104, of two smaller lobes (smaller lobes 3106 and 3108 in representation 3100, 3110 and 3112 in representation 3102, and 3114 and 3116 in representation 3104), relative to the larger lobe 3118, 3120, and 3122, respectively, in the center. In representations 3102 and 3104, small lobe 3112 or 3116 is combined with larger lobe 3120 or 3122, decreasing the laser beam spread width disproportionately less than small lobe 3110 or 3114 moving away and increasing the beam spread width. FIG. 31 includes three representations 3100, 3102, and 3104 that indicate how this lobe interaction can be visualized as the simulated shock was moved away from the laser beam center (W corresponds to the estimated beam spread width). Notice that in representation 3104, small lobe 3116 is completely inside larger lobe 3122, thus it does not have effect on the beam spread width.

The diffraction lobe movement seen in FIGS. 24 and 31 often results in dark areas in the images that can interfere with the CPC technique. This effect can be seen in FIG. 25 within the simulated shock displacement range of 0.585 mm to 0.63 mm, where there is a discontinuity in the results. One possible explanation is that the displacement points 0.585 mm and 0.6 mm have a dark spot interference causing the consecutive pixel counting to stop short. Another possible reason is that displacement points 0.615 mm and 0.63 mm have a bright speckle that connected two lobes for a longer than normal sequence of consecutive bright pixels. Regardless of the reason, the sometimes random light speckles are an unpredictable variable that have a more noticeable effect on the CPC technique as compared with the SPC technique.

As demonstrated in FIG. 29, The SPC technique provides consistently better results than the CPC technique. The SPC technique on a larger viewing screen was superior to the CPC technique in distinguishing when the laser beam went through the center of the simulated shock. Results obtained by the SPC technique can be further improved if necessary by capturing the diffraction pattern that extended beyond the field of view of camera 1808. Results can also be improved by selecting an optimal intensity threshold as explained above in connection with FIGS. 24 and 25. Characteristics of such an intensity threshold are that the threshold ignores noise of the system, such as ambient light sources, yet is sensitive enough to pick up the dim diffraction patterns.

As described herein, the innovation could benefit the development of in-flight shock detection. If the shock locations can be detected, then means are available to restore the shock-on-lip condition so that undesirable consequences (e.g., over-speeding, under-speeding, spillage drag, separation due to boundary-layer interaction, etc.) may be prevented. The systems and methods described herein can be developed into a compact flight-weight unit, and will provide a vehicle with a vital instrument capability.

The systems and methods of shock detection described herein have potential broad application to both flight and ground based testing of supersonic and hypersonic systems, as well as multiple non-testing applications (e.g., in-flight monitoring, or as part of a control system to maintain desired flight conditions, etc.). In some embodiments, a shock sensing system as described herein can be used as a control system to determine at least one of the presence, position, or angle of one or more shocks, such that in-flight adjustments may be made to maintain favorable flight conditions. For example, mixed compression inlets could make use of the high frequency of detection available due to this technology to avoid inlet buzz and/or unstart. Conventional systems cannot provide feedback to a control system at high enough frequencies to be useful to unstart detection, or only provide information about the condition of the flow at a single point. Various embodiments described herein can provide appropriately high frequency response while conveying information about the state of the shock system over a range of positions.

In aspects, the innovation described herein can be used to control and monitor shocks that occur during supersonic and hypersonic flight. The features, functions and benefits of the innovation could also be used during high speed aerodynamic tests in ground based facilities. Outside of aerospace applications the invention could also be used for multiplexing and switching of signals in optical communication and sensing systems. While specific examples and uses of the techniques and systems described herein have been noted, it is to be understood that alternative shock detection and location identification embodiments exist. These alternatives are to be included within the scope of this specification and claims appended hereto.

In other words, what has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A shock sensing system, comprising:
   a light sheet generator that produces one or more sectors of light by utilizing diffraction of light, wherein a subset of the sectors form a sheet of light located in a plane, wherein the sectors of light are produced prior to their entering an aerodynamic flow;
   one or more stationary optical elements that diffract light into one or more sectors of light and directs at least one of the sectors of light into an aerodynamic flow;
   a photodetector configured to detect a variation in intensity of the at least one sector of light; and
   a processor coupled to the photodetector, wherein the processor determines at least one of presence or position of a shock by processing data received from the photodetector.

2. The shock sensing system of claim 1, wherein the processor employs a Summing Pixel Counting (SPC) technique to determine one of presence or position of the shock.

3. The shock sensing system of claim 1, wherein the processor employs a Consecutive Pixel Counting (CPC) technique to determine one of presence or position of the shock.

4. The shock sensing system of claim 1, wherein the optical element is a lens, having a focal plane, arranged such that a diffraction element is in the focal plane of the lens.

5. The shock sensing system of claim 4, wherein the diffraction element is stationary and is selected such that the at least one sector of light directed through the aerodynamic flow illuminates an area of interest void of dark zones.

6. The shock sensing system of claim 4, wherein a pencil-shaped column of light, having a direction, interacts with a direction manipulating element in a time-dependent manner, wherein the pencil-shaped column of light scans through at least a portion of the aerodynamic flow.

7. The shock sensing system of claim 6, wherein the diffraction element is positioned such that the diffraction element diffracts the pencil-shaped column of light either during or after the pencil-shaped column of light scans through the aerodynamic flow.

8. The shock sensing system of claim 7, wherein the diffraction element is an opaque wire.

9. The shock sensing system of claim 7, wherein the diffraction element is a semi-transparent optical fiber.

10. The shock sensing system of claim 6, wherein the diffraction element comprises two or more wires in a same plane normal to the direction of the pencil-shaped column of light.

11. The shock sensing system of claim 10, wherein the processor determines a two-dimensional position of the shock by processing data received from the photodetector.

12. The shock sensing system of claim 10, wherein the processor determines a position and angle of the shock by processing data received from the photodetector.

13. The shock sensing system of claim 10, wherein the processor determines at least one of the presence or position of a second shock by processing data received from the photodetector.

14. The shock sensing system of claim 6, further comprising a beam alignment element that forms light into the pencil-shaped column of light, wherein the pencil-shaped column is a narrow Gaussian beam of light.

15. The shock sensing system of claim 14, further comprising a light source that generates the light.

16. The shock sensing system of claim 15, wherein the light source is a laser.

17. The shock sensing system of claim 1, wherein the photodetector comprises a charge-coupled device (CCD) array.

18. The shock sensing system of claim 1, comprising:
   a pressure sensor that detects air pressure in the aerodynamic flow; and
   a magnification controller that selects a magnification based at least in part on application of a known algorithm to the detected air pressure; and
   an optical collimator with a variable magnification that changes a diameter of a pencil-shaped column of light based at least in part on the selected magnification.

19. A control system for detecting aerodynamic shocks in a vehicle, comprising:
   a light sheet generator that produces one or more sheets of light by utilizing diffraction of light, wherein the sectors of light are produced prior to their entering an aerodynamic flow;
   one or more stationary optical element that diffracts light into one or more sectors of light and directs the one or more sheets of light through an inlet of the vehicle;

at least one photodetector that monitors the one or more sheets of light directed through the inlet; and a processor that determines one or more of a presence, a position, or an angle of an aerodynamic shock in the inlet based at least in part on the one or more monitored sheets of light.

* * * * *